(12) United States Patent
Beall et al.

(10) Patent No.: US 12,024,461 B2
(45) Date of Patent: Jul. 2, 2024

(54) ION EXCHANGEABLE, OPAQUE GAHNITE-SPINEL GLASS CERAMICS WITH HIGH HARDNESS AND MODULUS

(71) Applicant: CORNING INCORPORATED, Corning, NY (US)

(72) Inventors: George Halsey Beall, Big Flats, NY (US); Alexandra Lai Ching Kao Andrews Mitchell, Ithaca, NY (US); Charlene Marie Smith, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/837,467

(22) Filed: Jun. 10, 2022

(65) Prior Publication Data
US 2022/0298063 A1    Sep. 22, 2022

Related U.S. Application Data

(62) Division of application No. 16/692,185, filed on Nov. 22, 2019, now Pat. No. 11,370,697.
(Continued)

(51) Int. Cl.
*C03C 10/00*        (2006.01)
*C03B 23/03*        (2006.01)
(Continued)

(52) U.S. Cl.
CPC ...... *C03C 10/0036* (2013.01); *C03B 23/0305* (2013.01); *H05K 5/0017* (2013.01); *H05K 5/02* (2013.01)

(58) Field of Classification Search
CPC ............................ C03C 10/00; C03C 10/0036
See application file for complete search history.

(56) References Cited

U.S. PATENT DOCUMENTS

| | | |
|---|---|---|
| 3,681,102 A | 8/1972 | Beall |
| 4,687,750 A | 8/1987 | Pinckney |

(Continued)

FOREIGN PATENT DOCUMENTS

| | | |
|---|---|---|
| EP | 0755901 A2 | 1/1997 |
| EP | 0869105 A1 | 10/1998 |

(Continued)

OTHER PUBLICATIONS

Dittmer Marc et al: "Crystallization and mechanical properties of MgO/Al2O3/SiO2/ZrO2glass-ceramics with and without the addition of yttria", Solid State Sciences, Elsevier, Paris, FR, vol. 13, No. 12, Oct. 12, 2011 (Oct. 12, 2011), pp. 2146-2153.

(Continued)

*Primary Examiner* — Bryan D. Ripa
*Assistant Examiner* — Cameron K Miller
(74) *Attorney, Agent, or Firm* — Travis B. Gasa; Kapil U. Banakar

(57) ABSTRACT

An opaque gahnite-spinel glass ceramic is provided. The glass ceramic includes a first crystal phase including $(Mg_xZn_{1-x})Al_2O_4$ where x is less than 1 and a second crystal phase includes at least one of tetragonal $ZrO_2$, $MgTa_2O_6$, mullite, and cordierite. The glass ceramic has a Young's modulus greater than or equal to 90 GPa, and has a hardness greater than or equal to 7.5 GPa. The glass ceramic may be ion exchanged. Methods for producing the glass ceramic are also provided.

18 Claims, 5 Drawing Sheets

Related U.S. Application Data

(60) Provisional application No. 62/773,682, filed on Nov. 30, 2018.

(51) Int. Cl.
    *H05K 5/00*          (2006.01)
    *H05K 5/02*          (2006.01)

(56) References Cited

U.S. PATENT DOCUMENTS

| | | |
|---|---|---|
| 5,001,086 A | 3/1991 | Carrier et al. |
| 5,476,821 A | 12/1995 | Beall et al. |
| 5,491,116 A | 2/1996 | Beall et al. |
| 5,968,857 A | 10/1999 | Pinckney |
| 6,245,411 B1 | 6/2001 | Goto et al. |
| 6,248,678 B1 | 6/2001 | Pinckney |
| 6,953,756 B2 | 10/2005 | Kawai et al. |
| 7,316,986 B2 | 1/2008 | Sirota et al. |
| 7,507,683 B2 | 3/2009 | Sirota et al. |
| 8,853,110 B2 | 10/2014 | Almoric et al. |
| 2001/0019014 A1* | 9/2001 | Kubota ............... C03C 10/00 204/157.41 |
| 2004/0087427 A1 | 5/2004 | Kawai et al. |
| 2005/0096208 A1 | 5/2005 | Zachau et al. |
| 2006/0009342 A1 | 1/2006 | Sirota et al. |
| 2010/0242715 A1 | 9/2010 | Raichel et al. |
| 2011/0135964 A1* | 6/2011 | Yagi .................. C03C 3/097 65/33.1 |
| 2013/0274085 A1 | 10/2013 | Beall et al. |
| 2016/0051451 A1 | 2/2016 | Durschang et al. |
| 2016/0102011 A1 | 4/2016 | Hu et al. |
| 2019/0161397 A1 | 5/2019 | Beall et al. |
| 2020/0407268 A1 | 12/2020 | Mitchell |

FOREIGN PATENT DOCUMENTS

| | | |
|---|---|---|
| EP | 2450320 A1 | 5/2012 |
| JP | 09-077531 A | 3/1997 |
| JP | 2000-185933 A | 7/2000 |
| JP | 2011-033714 A | 2/2011 |
| TW | 201819329 A | 6/2018 |
| WO | 2007/144875 A1 | 12/2007 |
| WO | 2015/153829 A1 | 10/2015 |
| WO | 2019/108876 A1 | 6/2019 |

OTHER PUBLICATIONS

International Search Report and Written Opinion of the International Searching Authority; PCT/US19/062519; Mailed Mar. 17, 2020; 11 Pages; European Patent Office.

International Search Report and Written Opinion of the International Searching Authority; PCT/US2019/062519; Mailed Mar. 17, 20; 13 Pgs.

Molla et al; "Crystallization, Mechanical, and Optical Properties of Transparent, Nanocrystalline Gahnite Glass-Ceramics"; Journal of the American Ceramic Society; 2017; 100; pp. 1963-1975.

Pinckney; "Transparent, High Strain Point Spinel Glass-Ceramics"; Journal of Non-Crystalline Solids, 255(2), 171-177 (1999).

Taiwanese Patent Application No. 108142425, Office Action, dated Jun. 9, 2023, 1 page; Taiwanese Patent Office.

Japanese Patent Application No. 2021-530153, Office Action dated Oct. 5, 2023, 5 pages (English Translation only), Japanese Patent Office.

\* cited by examiner

ION EXCHANGEABLE, OPAQUE GAHNITE-SPINEL GLASS CERAMICS WITH HIGH HARDNESS AND MODULUS

PRIORITY APPLICATIONS

This application is a divisional of U.S. application Ser. No. 16/692,185, filed on Nov. 22, 2019, which claims the benefit of priority to U.S. Application No. 62/773,682 filed on Nov. 30, 2018, both applications being incorporated herein by reference.

BACKGROUND

Field

The present specification generally relates to opaque glass ceramic compositions. More specifically, the present specification is directed to opaque gahnite-spinel glass ceramics that may be formed into housings for electronic devices.

Technical Background

Portable electronic devices, such as, smartphones, tablets, and wearable devices (such as, for example, watches and fitness trackers) continue to get smaller and more complex. As such, materials that are conventionally used on at least one external surface of such portable electronic devices also continue to get more complex. For instance, as portable electronic devices get smaller and thinner to meet consumer demand, the housings used in these portable electronic devices also get smaller and thinner, resulting in higher performance requirements for the materials used to form these components.

Accordingly, a need exists for materials that exhibit higher performance, such as resistance to damage, for use in portable electronic devices.

SUMMARY

According to aspect (1), a glass-ceramic is provided. The glass ceramic comprises: a first crystal phase including $(Mg_xZn_{1-x})Al_2O_4$ where x is less than 1; and a second crystal phase including at least one of tetragonal $ZrO_2$, $MgTa_2O_6$, mullite, and cordierite; wherein the glass-ceramic is opaque in the visible range, has a Young's modulus greater than or equal to 90 GPa, and has a hardness greater than or equal to 7.5 GPa.

According to aspect (2), the glass-ceramic of aspect (1) is provided, further comprising at least one of $Li_2O$ and $Na_2O$.

According to aspect (3), the glass-ceramic of aspect (1) is provided, further comprising $Li_2O$ and $Na_2O$.

According to aspect (4), the glass-ceramic of any one of aspects (1) to (3) is provided, wherein x is greater than 0.

According to aspect (5), the glass-ceramic of any one of aspects (1) to (4) is provided, further comprising from greater than or equal to 35 mol % to less than or equal to 60 mol % $SiO_2$.

According to aspect (6), the glass-ceramic of any one of aspects (1) to (5) is provided, further comprising: 35 mol % to 55 mol % $SiO_2$; greater than or equal to 18 mol % $Al_2O_3$; greater than or equal to 5 mol % MgO; and greater than or equal to 2 mol % $P_2O_5$.

According to aspect (7), the glass-ceramic of any one of aspects (1) to (6) is provided, further comprising: 0 mol % to 14 mol % ZnO; 0 mol % to 5 mol % $TiO_2$; 0 mol % to 5 mol % $Na_2O$; 0 mol % to 5 mol % $Li_2O$; 0 mol % to 2 mol % BaO; 0 mol % to 4 mol % $B_2O_3$; 0 mol % to 1 mol % CaO; 0 mol % to 3 mol % $Eu_2O_3$; 0 mol % to 6 mol % $Ta_2O_5$; 0 mol % to 5 mol % $La_2O_3$; 0 mol % to 0.1 mol % $As_2O_5$; and 0 mol % to 0.3 mol % $SnO_2$.

According to aspect (8), the glass-ceramic of any one of aspects (1) to (7) is provided, wherein $ZrO_2+TiO_2+Eu_2O_3+Ta_2O_5+La_2O_3 \leq 6$ mol %.

According to aspect (9), the glass-ceramic of any one of aspects (1) to (8) is provided, wherein the glass ceramic is substantially free of $TiO_2$.

According to aspect (10), the glass-ceramic of any one of aspects (1) to (9) is provided, wherein $ZrO_2+TiO_2+Eu_2O_3+Ta_2O_5+La_2O_3 \leq 5.5$ mol %, and the glass ceramic comprises at least one of: $La_2O_3$; $Ta_2O_5$; and greater than or equal to 2 mol % $Li_2O$.

According to aspect (11), the glass-ceramic of any one of aspects (1) to (9) is provided, wherein $ZrO_2+TiO_2+Eu_2O_3+Ta_2O_5+La_2O_3 \leq 5.1$ mol %, and the glass ceramic comprises less than 2 mol % $Li_2O$ and is substantially free of $La_2O_3$ and $Ta_2O_5$.

According to aspect (12), the glass-ceramic of any one of aspects (1) to (11) is provided, wherein the glass ceramic exhibits a crystallinity of at least 35 wt %.

According to aspect (13), the glass-ceramic of any one of aspects (1) to (12) is provided, wherein the glass ceramic exhibits a crystallinity of from greater than or equal to 35 wt % to less than or equal to 60 wt %.

According to aspect (14), the glass-ceramic of any one of aspects (1) to (13) is provided, wherein the glass ceramic has a Young's modulus of from greater than or equal to 100 GPa to less than or equal to 125 GPa.

According to aspect (15), the glass-ceramic of any one of aspects (1) to (14) is provided, wherein the glass ceramic has a hardness of from greater than or equal to 8 GPa to less than or equal to 13 GPa.

According to aspect (16), the glass-ceramic of any one of aspects (1) to (15) is provided, wherein the glass ceramic is substantially colorless.

According to aspect (17), the glass-ceramic of any one of aspects (1) to (16) is provided, wherein the second crystal phase comprises tetragonal $ZrO_2$.

According to aspect (18), the glass-ceramic of any one of aspects (1) to (16) is provided, wherein the glass ceramic is substantially free of $ZrO_2$ and the second crystal phase comprises $MgTa_2O_6$.

According to aspect (19), the glass-ceramic of any one of aspects (1) to (16) is provided, wherein the glass ceramic is substantially free of nucleating agents and the second crystal phase comprises mullite and cordierite.

According to aspect (20), the glass-ceramic of any one of aspects (1) to (19) is provided, further comprising a compressive stress region extending from a surface of the glass ceramic to a depth of compression.

According to aspect (21), a consumer electronic product is provided. The consumer electronic product comprises: a housing comprising a front surface, a back surface and side surfaces; electrical components at least partially within the housing, the electrical components comprising at least a controller, a memory, and a display, the display at or adjacent the front surface of the housing; and a cover substrate disposed over the display, wherein at least a portion of the housing comprises the glass ceramic of any one of aspects (1) to (19).

According to aspect (22), a consumer electronic product is provided. The consumer electronic product comprises: a housing comprising a front surface, a back surface and side surfaces; electrical components at least partially within the housing, the electrical components comprising at least a controller, a memory, and a display, the display at or adjacent the front surface of the housing; and a cover substrate disposed over the display, wherein at least a portion of the housing comprises the glass ceramic of aspect (20).

According to aspect (23), a method is provided. The method comprises: ceramming a precursor glass to form a glass ceramic that is opaque in the visible range, wherein the glass ceramic comprises: a first crystal phase including $(Mg_xZn_{1-x})Al_2O_4$ where x is less than 1; and a second crystal phase including at least one of tetragonal $ZrO_2$, $MgTa_2O_6$, mullite, and cordierite; wherein the glass-ceramic has a Young's modulus greater than or equal to 90 GPa, and has a hardness greater than or equal to 7.5 GPa.

According to aspect (24), the method of aspect (23) is provided, further comprising forming nuclei in the precursor glass prior to the ceramming.

According to aspect (25), the method of aspect (24) is provided, wherein the forming nuclei comprises heat treating the precursor glass at a temperature of at least 700° C. for a time period of at least 1 hour.

According to aspect (26), the method of any one of aspects (23) to (25) is provided, wherein the ceramming comprises heat treating the precursor glass at a temperature of at least 750° C. for a time period of at least 30 minutes.

According to aspect (27), the method of aspect (23) is provided, wherein the method does not include a separate nucleation step.

According to aspect (28), the method of aspect (23) is provided, wherein the ceramming comprises irradiating the precursor glass with a laser to form the glass ceramic.

According to aspect (29), the method of any one of aspects (23) to (28) is provided, further comprising ion exchanging the glass ceramic.

According to aspect (30), the method of aspect (29) is provided, wherein the ion exchanging comprises contacting the glass ceramic with a mixed ion exchange bath.

According to aspect (31), a glass is provided. The glass comprises: 35 mol % to 55 mol % $SiO_2$; greater than or equal to 18 mol % $Al_2O_3$; greater than or equal to 5 mol % MgO; greater than or equal to 2 mol % $P_2O_5$; 0 mol % to 14 mol % ZnO; 0 mol % to 5 mol % $TiO_2$; 0 mol % to 5 mol % $Na_2O$; 0 mol % to 5 mol % $Li_2O$; 0 mol % to 2 mol % BaO; 0 mol % to 4 mol % $B_2O_3$; 0 mol % to 1 mol % CaO; 0 mol % to 3 mol % $Eu_2O_3$; 0 mol % to 6 mol % $Ta_2O_5$; 0 mol % to 5 mol % $La_2O_3$; 0 mol % to 0.1 mol % $As_2O_5$; and 0 mol % to 0.3 mol % $SnO_2$.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, serve to explain the principles and operations of the claimed subject matter.

DETAILED DESCRIPTION

Figure 1:
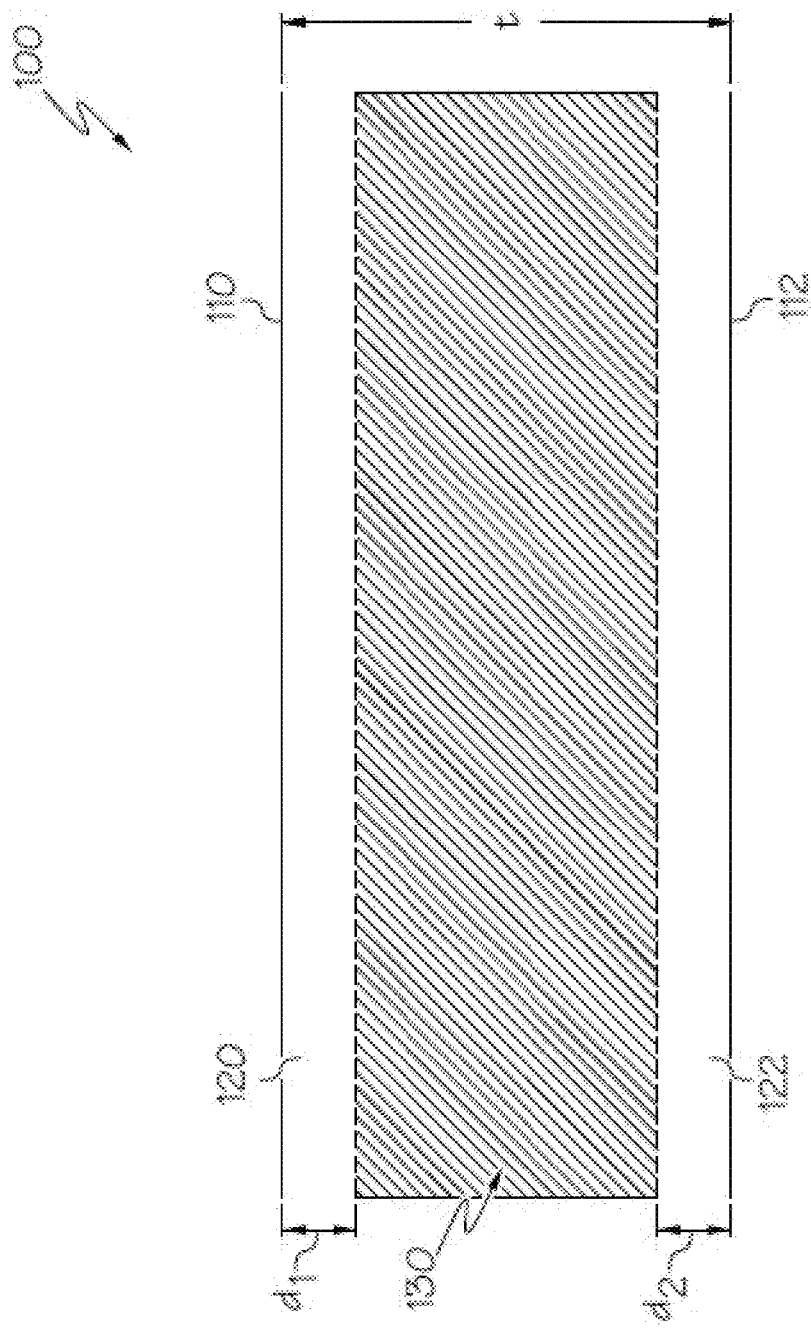
FIG. 1 schematically depicts a cross section of a glass ceramic having compressive stress layers on surfaces thereof according to embodiments disclosed and described herein.

Reference will now be made in detail to opaque gahnite-spinel glass ceramics according to various embodiments. In particular, the opaque gahnite-spinel glass ceramics have a high hardness, and may be ion exchanged. Therefore, the opaque gahnite-spinel glass ceramics are suited for use as housings in portable electronic devices.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. Whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Unless otherwise specified, all compositions of the glasses and glass ceramics described herein are expressed in terms of mole percent (mol %), and the constituents are provided on an oxide basis. Unless otherwise specified, all temperatures are expressed in terms of degrees Celsius (° C.).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. For example, a glass that is "substantially free of $K_2O$" is one in which $K_2O$ is not actively added or batched into the glass, but may be present in very small amounts as a contaminant, such as in amounts of less than about 0.01 mol %. As utilized herein, when the term "about" is used to modify a value, the exact value is also disclosed.

The glass ceramics contain a first crystal phase, a second crystal phase, and a residual glass phase. The first crystal phase may be the predominant crystal phase, defined herein as the crystal phase that accounts for the largest fraction of the glass ceramic by weight. Accordingly, the second crystal phase may be present in a weight percent of the glass ceramic that is less than the weight percent of the first crystal phase. In some embodiments, the glass ceramic may include more than two crystal phases.

In embodiments, the first crystal phase includes $(Mg_xZn_{1-x})Al_2O_4$, where x is less than 1. The crystal phase $(Mg_xZn_{1-x})Al_2O_4$ may be generally referred to as a gahnite-spinel solid solution, with the understanding that where x is zero the crystal phase is pure gahnite. In embodiments, x may be greater than or equal to 0, such as greater than or equal to about 0.1, greater than or equal to about 0.2, greater than or equal to about 0.3, greater than or equal to about 0.4, greater than or equal to about 0.5, greater than or equal to about 0.6, greater than or equal to about 0.7, greater than or equal to about 0.8, or greater than or equal to about 0.9. In embodiments, x may be less than 1.0, such as less than or equal to about 0.9, less than or equal to about 0.8, less than or equal to about 0.7, less than or equal to about 0.6, less than or equal to about 0.5, less than or equal to about 0.4, less than or equal to about 0.3, less than or equal to about 0.2, or less than or equal to about 0.1. It should be understood that, in embodiments, any of the above ranges may be combined with any other range. In embodiments, x may be greater than or equal to 0 to less than 1.0, such as greater than or equal to about 0.1 to less than or equal to about 0.9, greater than or equal to about 0.2 to less than or equal to about 0.8, greater than or equal to about 0.3 to less than or equal to about 0.7, or greater than or equal to about 0.4 to less than or equal to about 0.6, and all ranges and sub-ranges between the foregoing values.

The crystal phases have a crystallite size. The opaque nature of the glass ceramic may be due at least in part to large crystallite sizes. The crystallite size as used herein is determined by powder x-ray diffraction (XRD) analysis with a scan from 5 to 80 degrees 2θ, unless otherwise specified. The crystallite size was estimated using the Scherrer equation function available in MDI Jade, the software package utilized for phase identification and quantitative analysis.

In embodiments, the second crystal phase includes at least one of tetragonal zirconia ($ZrO_2$), $MgTa_2O_6$, mullite, and cordierite. The second crystal phase in the glass ceramic is may depend on the composition of the precursor glass and the ceramming schedule. The formation of the tetragonal $ZrO_2$ in the glass ceramic requires the presence of $ZrO_2$ in the precursor glass. Without wishing to be bound by any particular theory, it is believed that the tetragonal $ZrO_2$ crystal phase crystallizes before the $(Mg_xZn_{1-x})Al_2O_4$ crystal phase during ceramming, and acts as a nucleation site for the $(Mg_xZn_{1-x})Al_2O_4$ crystal phase. Additionally, without wishing to be bound by any particular theory, it is believed that any $TiO_2$ included in the glass ceramic partitions into the tetragonal $ZrO_2$ phase, and acts as a nucleating agent for the tetragonal $ZrO_2$ phase. The $MgTa_2O_6$ may be the second crystal phase when the precursor glass is substantially free or free of $ZrO_2$. The mullite and cordierite second crystal phase may result when the precursor glass is substantially free or free of nucleating agents. In some embodiments, the composition of the precursor glass and the ceramming conditions may result in a glass ceramic that includes additional crystal phases beyond those described above.

In embodiments, the total crystallinity of the glass ceramic is high enough to provide enhanced mechanical properties, such as hardness, Young's modulus, and scratch resistance. As utilized herein, the total crystallinity is provided in wt % and refers to the sum of the wt % of all the crystal phases present in the glass ceramic relative to the total weight of the glass ceramic. In embodiments, the total crystallinity is greater than or equal to about 35 wt %, such as greater than or equal to about 40 wt %, greater than or equal to about 45 wt %, greater than or equal to about 50 wt %, greater than or equal to about 55 wt %, or more. In embodiments, the total crystallinity is less than or equal to about 60 wt %, such as less than or equal to about 55 wt %, less than or equal to about 50 wt %, less than or equal to about 45 wt %, less than or equal to about 40 wt %, or less. It should be understood that, in embodiments, any of the above ranges may be combined with any other range. In embodiments, the total crystallinity of the glass ceramic is from greater than or equal to about 35 wt % to less than or equal to about 60 wt %, such as greater than or equal to about 40 wt % to less than or equal to about 55 wt %, greater than or equal to about 45 wt % to less than or equal to about 50 wt %, and all ranges and sub-ranges between the foregoing values. The total crystallinity of the glass ceramic is determined through Rietveld quantitative analysis of the XRD data gathered as described above. The Rietveld analysis employs a least squares method to model the XRD data and then determine the concentration of phases in the sample based on known lattice and scale factors for the identified phases.

The glass ceramics are opaque in the visible range. As utilized herein, a glass ceramic is considered opaque when exhibiting a transmittance of less than 50% in the visible range (380 nm to 760 nm). The transmittance, as utilized herein refers to total transmittance, and is measured with a Perkin Elmer Lambda 950 UV/VIS/NIR spectrophotometer with a 150 mm integrating sphere. The samples were mounted at the sphere's entrance port, allowing for collection of wide angle scattered light. The total transmittance data was collected with the reference Spectralon reflectance disc over the sphere's exit port. The percent of total transmittance (% T) was calculated relative to an open beam baseline measurement. In embodiments, the glass ceramic exhibits a transmittance in the visible range of less than 50%, such as less than or equal to about 45%, less than or equal to about 40%, less than or equal to about 35%, less than or equal to about 30%, or less.

In embodiments, glass ceramics appear white. In embodiments, the glass ceramics may be colorless or substantially colorless. As utilized herein, substantially colorless refers to the following color coordinate space: L*>90, a* from −0.2 to 0.2, and b* from −0.1 to 0.6. The color coordinates are measured using a UV/Vis/NIR spectrophotometer configured with an integrating sphere. The measurement was carried out over a wavelength of 380 nm to 770 nm with a 2 nm interval with illuminants D65, A, and F2 with a 10° observer. The procedures for determining the color space in the CIE system are described in more detail in "Standard practice for computing the colors of objects by using the CIR system" (ASTM E308-08).

In embodiments, the glass ceramics may have a hardness that renders the glass ceramic less susceptible to damage, such as by providing increased scratch resistance. As utilized herein, the hardness is measured with a nanoindenter and is reported in GPa, unless otherwise indicated. The nanoindenter measurement was performed using a diamond Berkovich tip using the continuous stiffness method as implemented with an Agilent G200 nanoindenter. The continuous stiffness method utilizes a small sinusoidal displacement signal (1 nm amplitude at 45 Hz) superimposed on the tip as it is loaded into the specimen surface, and the load, depth, and contact stiffness are continuously determined. Without wishing to be bound by any particular theory, the hardness of the glass ceramic is believed to be due at least in part to the hardness of the $(Mg_xZn_{1-x})Al_2O_4$ and secondary crystal phases, such as tetragonal $ZrO_2$, contained therein.

In embodiments, the glass ceramic has a hardness of greater than or equal to about 7.5 GPa, such as greater than or equal to about 7.6 GPa, greater than or equal to about 7.7 GPa, greater than or equal to about 7.8 GPa, greater than or equal to about 7.9 GPa, greater than or equal to about 8.0 GPa, greater than or equal to about 8.1 GPa, greater than or equal to about 8.2 GPa, greater than or equal to about 8.3 GPa, greater than or equal to about 8.4 GPa, greater than or equal to about 8.5 GPa, greater than or equal to about 8.6 GPa, greater than or equal to about 8.7 GPa, greater than or equal to about 8.8 GPa, greater than or equal to about 8.9 GPa, greater than or equal to about 9.0 GPa, greater than or equal to about 9.1 GPa, greater than or equal to about 9.2 GPa, greater than or equal to about 9.3 GPa, greater than or equal to about 9.4 GPa, greater than or equal to about 9.5 GPa, greater than or equal to about 9.6 GPa, greater than or equal to about 9.7 GPa, greater than or equal to about 9.8 GPa, greater than or equal to about 9.9 GPa, greater than or equal to about 10.0 GPa, greater than or equal to about 10.1 GPa, greater than or equal to about 10.2 GPa, greater than or equal to about 10.3 GPa, greater than or equal to about 10.4 GPa, greater than or equal to about 10.5 GPa, greater than or equal to about 10.6 GPa, greater than or equal to about 10.7 GPa, greater than or equal to about 10.8 GPa, greater than or equal to about 10.9 GPa, greater than or equal to about 11.0 GPa, greater than or equal to about 11.1 GPa, greater than or equal to about 11.2 GPa, greater than or equal to about 11.3 GPa, greater than or equal to about 11.4 GPa, greater than or equal to about 11.5 GPa, greater than or equal to about 11.6 GPa, greater than or equal to about 11.7 GPa, greater than or equal to about 11.8 GPa, greater than or equal to about 11.9 GPa, greater than or equal to about 12.0 GPa, greater than or equal to 12.1 GPa, greater than or equal to about 12.2 GPa, greater than or equal to about 12.3 GPa, greater than or equal to about 12.4 GPa, greater than or equal to about 12.5 GPa, greater than or equal to about 12.6 GPa, greater than or equal to about 12.7 GPa, greater than or equal to about 12.8 GPa, greater than or equal to about 12.9 GPa, or more. It should be understood that, in embodiments, any of the above ranges may be combined with any other range. In embodiments, the glass ceramic has a hardness of greater than or equal to about 7.5 GPa to less than or equal to about 13.0 GPa, such as greater than or equal to about 8.0 GPa to less than or equal to about 12.5 GPa, greater than or equal to about 8.5 GPa to less than or equal to about 12.0 GPa, greater than or equal to about 9.0 GPa to less than or equal to about 11.5 GPa, greater than or equal to about 9.5 GPa to less than or equal to about 11.0 GPa, greater than or equal to about 10.0 GPa to less than or equal to about 10.5 GPa, and all ranges and sub-ranges between the foregoing values.

Glass ceramics according to embodiments may have a Young's modulus greater than or equal to about 90.0 GPa, such as greater than or equal to about 92.0 GPa, greater than or equal to about 94.0 GPa, greater than or equal to about 96.0 GPa, greater than or equal to about 98.0 GPa, greater than or equal to about 100.0 GPa, greater than or equal to about 102.0 GPa, greater than or equal to about 104.0 GPa, greater than or equal to about 106.0 GPa, greater than or equal to about 108.0 GPa, greater than or equal to about 110.0 GPa, greater than or equal to about 112.0 GPa, greater than or equal to about 114.0 GPa, greater than or equal to about 116.0 GPa, greater than or equal to about 118.0 GPa, greater than or equal to about 120.0 GPa, greater than or equal to about 122.0 GPa, greater than or equal to about 124.0 GPa, or more. It should be understood that, in embodiments, any of the above ranges may be combined with any other range. In embodiments, the glass ceramics have a Young's modulus from greater than or equal to about 90.0 GPa to less than or equal to about 125.0 GPa, such as from greater than or equal to about 92.0 GPa to less than or equal to about 123.0 GPa, from greater than or equal to about 94.0 GPa to less than or equal to about 121.0 GPa, from greater than or equal to about 96.0 GPa to less than or equal to about 119.0 GPa, from greater than or equal to about 98.0 GPa to less than or equal to about 117.0 GPa, from greater than or equal to about 100.0 GPa to less than or equal to about 115.0 GPa, from greater than or equal to about 102.0 GPa to less than or equal to about 113.0 GPa, from greater than or equal to about 104.0 GPa to less than or equal to about 111.0 GPa, from greater than or equal to about 106.0 GPa to less than or equal to about 109.0 GPa, from greater than or equal to about 107.0 GPa to less than or equal to about 108.0 GPa, and all ranges and sub-ranges between the foregoing values. The Young's modulus values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts," and are reported in GPa, unless otherwise specified.

The glass ceramic may have a strain point and an anneal point high enough to allow additional processing of the glass ceramic at temperatures of up to about 800° C. without detrimental effect on the structural integrity of the glass ceramic. This additional processing may include chemical strengthening, such as ion exchange. These elevated processing temperatures may increase the efficiency of additional processing, such as by reducing the time necessary for the additional processing. In embodiments, the strain point may be less than or equal to about 900° C., such as from greater than or equal to about 700° C. to less than or equal to about 900° C. These strain points allow for improved thermal stability and a larger potential temperature range for ion exchange treatments. If the strain point is too low, the additional processing of the glass ceramic may become difficult. If the strain point is too high, the manufacturing of the precursor glass compositions may become difficult.

The composition of the opaque gahnite-spinel glass ceramics will now be described. In embodiments of glass ceramics described herein, the concentration of constituent components (e.g., $SiO_2$, $Al_2O_3$, $Li_2O$, $Na_2O$ and the like) are given in mole percent (mol %) on an oxide basis, unless otherwise specified. Components of the glass ceramics according to embodiments are discussed individually below. It should be understood that any of the variously recited ranges of one component may be individually combined with any of the variously recited ranges for any other component.

In embodiments of the glass ceramics disclosed herein, $SiO_2$ is the largest constituent. Pure $SiO_2$ has a relatively low CTE and is alkali free. However, pure $SiO_2$ has a high melting point. Accordingly, if the concentration of $SiO_2$ in the glass ceramic is too high, the formability of the precursor glass composition used to form the glass ceramics may be diminished as higher concentrations of $SiO_2$ increase the difficulty of melting the glass, which, in turn, adversely impacts the formability of the precursor glass. In embodiments, the glass composition generally comprises $SiO_2$ in an amount greater than or equal to about 35.0 mol %, such as greater than or equal to about 40.0 mol %, greater than or equal to about 45.0 mol %, greater than or equal to about 50.0 mol %, greater than or equal to about 55.0 mol %, or more. In embodiments, the glass composition comprises $SiO_2$ in amounts less than or equal to about 60.0 mol %, such as less than or equal to about 55.0 mol %, less than or equal to about 50.0 mol %, less than or equal to about 45.0 mol %, less than or equal to about 40.0 mol %, or less. It should be understood that, in embodiments, any of the above ranges may be combined with any other range. In embodiments, the glass composition comprises $SiO_2$ in an amount from greater than or equal to about 35.0 mol % to less than or equal to about 60.0 mol %, such as from greater than or equal to about 35.0 mol % to less than or equal to about 55.0 mol %, from greater than or equal to about 40.0 mol % to less than or equal to about 50.0 mol %, about 45.0 mol %, and all ranges and sub-ranges between the foregoing values.

The glass ceramics of embodiments may further comprise $Al_2O_3$. $Al_2O_3$ may increase the viscosity of the precursor glass compositions used to form the glass ceramics due to its tetrahedral coordination in a glass melt formed from a glass composition, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes, such as the fusion forming process. The $Al_2O_3$ in the precursor glass also supplies the aluminum necessary to form the gahnite-spinel crystal phase when the precursor glass is cerammed to form a glass ceramic. In embodiments, the glass composition generally comprises $Al_2O_3$ in a concentration of greater than or equal to about 18.0 mol %, such as greater than or equal to about 19.0 mol %, greater than or equal to about 20.0 mol %, greater than or equal to about 21.0 mol %, greater than or equal to about 22.0 mol %, greater than or equal to about 23.0 mol %, greater than or equal to about 24.0 mol %, greater than or equal to about 25.0 mol %, or more. In embodiments, the glass composition comprises $Al_2O_3$ in amounts less than or equal to about 26.0 mol %, such as less than or equal to about 25.0 mol %, less than or equal to about 24.0 mol %, less than or equal to about 23.0 mol %, less than or equal to about 22.0 mol %, less than or equal to about 21.0 mol %, less than or equal to about 20.0 mol %, less than or equal to about 19.0 mol %, or less. It should be understood that, in embodiments, any of the above ranges may be combined with any other range. In embodiments, the glass composition comprises $Al_2O_3$ in an amount from greater than or equal to about 18.0 mol % to less than or equal to about 26.0 mol %, such as from greater than or equal to about 19.0 mol % to less than or equal to about 25.0 mol %, from greater than or equal to about 20.0 mol % to less than or equal to about 24.0 mol %, from greater than or equal to about 21.0 mol % to less than or equal to about 23.0 mol %, about 22.0 mol %, and all ranges and sub-ranges between the foregoing values.

The glass ceramics of embodiments may further comprise ZnO. The ZnO in the precursor glass supplies the zinc necessary to form the gahnite-spinel crystal phase when the precursor glass is cerammed to form a glass ceramic. In embodiments, the glass composition generally comprises ZnO in a concentration of greater than or equal to 0 mol %, such as greater than or equal to about 1.0 mol %, greater than or equal to about 2.0 mol %, greater than or equal to about 3.0 mol %, greater than or equal to about 4.0 mol %, greater than or equal to about 5.0 mol %, greater than or equal to about 6.0 mol %, greater than or equal to about 7.0 mol %, greater than or equal to about 8.0 mol %, greater than or equal to about 9.0 mol %, greater than or equal to about 10.0 mol %, greater than or equal to about 11.0 mol %, greater than or equal to about 12.0 mol %, greater than or equal to about 13.0 mol %, or more. In embodiments, the glass composition comprises ZnO in amounts less than or equal to about 15.0 mol %, such as less than or equal to about 14.0 mol %, less than or equal to about 13.0 mol %, less than or equal to about 12.0 mol %, less than or equal to about 11.0 mol %, less than or equal to about 10.0 mol %, less than or equal to about 9.0 mol %, less than or equal to about 8.0 mol %, less than or equal to about 7.0 mol %, less than or equal to about 6.0 mol %, less than or equal to about 5.0 mol %, less than or equal to about 4.0 mol %, less than or equal to about 3.0 mol %, less than or equal to about 2.0 mol %, less than or equal to about 1.0 mol %, or less. It should be understood that, in embodiments, any of the above ranges may be combined with any other range. In embodiments, the glass composition comprises ZnO in an amount from greater than 0 mol % to less than or equal to about 15.0 mol %, such as from greater than or equal to about 1.0 mol % to less than or equal to about 14.0 mol %, from greater than or equal to about 2.0 mol % to less than or equal to about 13.0 mol %, from greater than or equal to about 3.0 mol % to less than or equal to about 12.0 mol %, from greater than or equal to about 4.0 mol % to less than or equal to about 11.0 mol %, from greater than or equal to about 5.0 mol % to less than or equal to about 10.0 mol %, from greater than or equal to about 6.0 mol % to less than or equal to about 9.0 mol %, from greater than or equal to about 7.0 mol % to less than or equal to about 8.0 mol %, and all ranges and sub-ranges between the foregoing values.

The glass ceramics of embodiments may further comprise MgO. The MgO in the precursor glass supplies the magnesium necessary to form a spinel solid solution containing crystal phase when the precursor glass is cerammed to form a glass ceramic. In embodiments, the amount of MgO in the glass ceramic is greater than or equal to about 5.0 mol %, such as greater than or equal to about 6.0 mol %, greater than or equal to about 7.0 mol %, greater than or equal to about 8.0 mol %, greater than or equal to about 9.0 mol %, greater than or equal to about 10.0 mol %, greater than or equal to about 11.0 mol %, greater than or equal to about 12.0 mol %, greater than or equal to about 13.0 mol %, greater than or equal to about 14.0 mol %, greater than or equal to about 15.0 mol %, or more. In embodiments, the amount of MgO in the glass ceramic is less than or equal to about 16.0 mol %, such as less than or equal to about 15.0 mol %, less than or equal to about 14.0 mol %, less than or equal to about 13.0 mol %, less than or equal to about 12.0 mol %, less than or equal to about 11.0 mol %, less than or equal to about 10.0 mol %, less than or equal to about 9.0 mol %, less than or equal to about 8.0 mol %, less than or equal to about 7.0 mol %, less than or equal to about 6.0 mol %, or less. It should be understood that, in embodiments, any of the above ranges may be combined with any other range. In embodiments, the amount of MgO in the glass ceramic is greater than or equal to about 5.0 mol % to less than or equal to about 16.0 mol %, such as greater than or equal to about 6.0 mol % to less than or equal to about 15.0 mol %, greater than or equal to about 7.0 mol % to less than or equal to about 14.0 mol %, greater than or equal to about 8.0 mol % to less than or equal to about 13.0 mol %, greater than or equal to about 9.0 mol % to less than or equal to about 12.0 mol %, greater than or equal to about 10.0 mol % to less than or equal to about 11.0 mol %, and all ranges and sub-ranges between the foregoing values. In embodiments where the ratio of MgO to ZnO is high in the glass ceramic, the opaqueness of the glass ceramic is enhanced.

The glass ceramics of embodiments may further comprise CaO. In embodiments, the amount of CaO in the glass ceramic is greater than or equal to 0 mol % to less than or equal to about 1.0 mol %, such as greater than or equal to about 0.1 mol % to less than or equal to about 0.9 mol %, greater than or equal to about 0.2 mol % to less than or equal to about 0.8 mol %, greater than or equal to about 0.3 mol % to less than or equal to about 0.7 mol %, greater than or equal to about 0.4 mol % to less than or equal to about 0.6 mol %, about 0.5 mol %, and all ranges and sub-ranges between the foregoing values.

The glass ceramics may further comprise $P_2O_5$. The inclusion of $P_2O_5$ may enhance the ion exchangeability of the glass ceramic. In embodiments, the glass ceramic may contain $P_2O_5$ in an amount greater than or equal to about 2.0 mol %, such as greater than or equal to about 2.5 mol % $P_2O_5$, greater than or equal to about 3.0 mol %, greater than or equal to about 3.5 mol %, greater than or equal to about 4.0 mol %, greater than or equal to about 4.5 mol %, greater than or equal to about 5.0 mol %, or more. In embodiments, the glass ceramic may contain $P_2O_5$ in an amount from greater than or equal to about 2.0 mol % to less than or equal to about 6.0 mol %, such as from greater than or equal to about 2.5 mol % to less than or equal to about 5.5 mol %, from greater than or equal to about 3.0 mol % to less than or equal to about 5.0 mol %, from greater than or equal to about 3.5 mol % to less than or equal to about 4.5 mol %, about 2.0 mol %, and all ranges and sub-ranges between the foregoing values.

The glass ceramics of embodiments may further comprise $B_2O_3$. $B_2O_3$ may increase the native damage resistance of the precursor glass. In embodiments, the glass composition comprises $B_2O_3$ in an amount from greater than or equal to 0 mol % to less than or equal to about 4.0 mol %, such as from greater than or equal to about 0.5 mol % to less than or equal to about 3.5 mol %, from greater than or equal to about 1.0 mol % to less than or equal to about 3.0 mol %, from greater than or equal to about 1.5 mol % to less than or equal to about 2.5 mol %, about 2.0 mol %, and all ranges and sub-ranges between the foregoing values.

The glass ceramics of embodiments may further comprise nucleating agents. The nucleating agents allow the formation of nuclei in the precursor glasses utilized form the glass ceramics. In some embodiments, the nucleating agents allow the glass ceramics to be cerammed without a separate nucleation step. The nucleating agents may be selected from $ZrO_2$, $TiO_2$, $Eu_2O_3$, $Ta_2O_5$, and $La_2O_3$. In embodiments, the total amount of nucleating agents in the glass ceramic may be an amount greater than or equal to 0 mol %, such as greater than or equal to about 1.0 mol %, greater than or equal to about 2.0 mol %, greater than or equal to about 3.0 mol %, greater than or equal to about 4.0 mol %, greater than or equal to about 5.0 mol %, or more. In embodiments, the total amount of nucleating agents in the glass ceramic may be an amount less than or equal to about 6.0 mol %, such as less than or equal to about 5.0 mol %, less than or equal to about 4.0 mol %, less than or equal to about 3.0 mol %, less than or equal to about 2.0 mol %, less than or equal to about 1.0 mol %, or less. It should be understood that, in embodiments, any of the above ranges may be combined with any other range. In embodiments, the total amount of nucleating agents in the glass ceramic may be an amount from greater than or equal to 0 mol % to less than or equal to about 6.0 mol %, such as an amount from greater than or equal to about 1.0 mol % to less than or equal to about 5.0 mol %, from greater than or equal to about 2.0 mol % to less than or equal to about 4.0 mol %, from greater than or equal to about 1.0 mol % to less than or equal to about 3.0 mol %, about 2.0 mol %, and all ranges and sub-ranges between the foregoing values. In some embodiments, the glass ceramic may contain nucleating agents in an amount of less than or equal to about 5.5 mol % and additionally contains at least one of $La_2O_3$, $Ta_2O_5$, and greater than or equal to about 2 mol % $Li_2O$. In some embodiments, the glass ceramic may contain nucleating agents in an amount of less than or equal to about 5.1 mol % and additionally contains less than 2 mol % $Li_2O$ and is substantially free of $La_2O_3$ and $Ta_2O_5$.

In embodiments, the glass ceramic may contain $Eu_2O_3$ in an amount from greater than or equal to 0 mol % to less than or equal to about 3.0 mol %, such as an amount from greater than or equal to about 0.5 mol % to less than or equal to about 2.5 mol %, from greater than or equal to about 1.0 mol % to less than or equal to about 2.0 mol %, about 1.5 mol %, and all ranges and sub-ranges between the foregoing values.

In embodiments, the glass ceramic may contain $Ta_2O_5$ in an amount from greater than or equal to 0 mol % to less than or equal to about 6.0 mol %, such as an amount from greater than or equal to about 1.0 mol % to less than or equal to about 5.0 mol %, from greater than or equal to about 2.0 mol % to less than or equal to about 4.0 mol %, from greater than or equal to about 1.0 mol % to less than or equal to about 3.0 mol %, about 2.0 mol %, and all ranges and sub-ranges between the foregoing values.

In embodiments, the glass ceramic may contain $La_2O_3$ in an amount from greater than or equal to 0 mol % to less than or equal to about 5.0 mol %, such as an amount from greater than or equal to about 1.0 mol % to less than or equal to about 4.0 mol %, from greater than or equal to about 2.0 mol % to less than or equal to about 3.0 mol %, and all ranges and sub-ranges between the foregoing values.

In embodiments, the glass ceramic may include $ZrO_2$ as the sole nucleating agent. In addition to acting as a nucleating agent, the presence of $ZrO_2$ in the precursor glass facilitates the crystallization of tetragonal $ZrO_2$ during the ceramming process. The use of $ZrO_2$ as the sole nucleating agent in the precursor glass compositions allows the production of glass ceramics that are colorless in appearance. In embodiments, the amount of $ZrO_2$ in the glass ceramic is greater than 0 mol %, such as greater than or equal to about 1.0 mol %, greater than or equal to about 2.0 mol %, greater than or equal to about 3.0 mol %, greater than or equal to about 4.0 mol %, greater than or equal to about 5.0 mol %, greater than or equal to about 6.0 mol %, greater than or equal to about 7.0 mol %, greater than or equal to about 8.0 mol %, or greater than or equal to about 9.0 mol %. It should be understood that, in embodiments, any of the above ranges may be combined with any other range. In embodiments, the amount of $ZrO_2$ in the glass ceramic is greater than 0 mol % to less than or equal to about 10.0 mol %, such as greater than or equal to about 1.0 mol % to less than or equal to about 9.0 mol %, greater than or equal to about 2.0 mol % to less than or equal to about 8.0 mol %, greater than or equal to about 3.0 mol % to less than or equal to about 7.0 mol %, or greater than or equal to about 4.0 mol % to less than or equal to about 6.0 mol %, and all ranges and sub-ranges between the foregoing values.

In embodiments, the glass ceramic may include $TiO_2$ as a nucleating agent. $TiO_2$ is an effective nucleating agent. However, when the amount of $TiO_2$ in the precursor glass is too high, the resulting glass ceramic may have an undesirable colored appearance. The glass ceramics that include $TiO_2$ may have a yellow or brown appearance in the visible range. Without wishing to be bound by any particular theory, it is believed that the reduction of $Ti^{4+}$ to $Ti^{3+}$ produces the colored appearance of the glass ceramic. In embodiments, the amount of $TiO_2$ in the glass ceramic is greater than or equal to 0 mol %, such as greater than or equal to about 1.0 mol %, greater than or equal to about 2.0 mol %, greater than or equal to about 3.0 mol %, greater than or equal to about 4.0 mol %, or more. In embodiments, the amount of $TiO_2$ in the glass ceramic is less than or equal to about 5.0 mol %, such as less than or equal to about 4.0 mol %, less than or equal to about 3.0 mol %, less than or equal to about 2.0 mol %, less than or equal to about 1.0 mol %, or less. It should be understood that, in embodiments, any of the above ranges may be combined with any other range. In embodiments, the amount of $TiO_2$ in the glass ceramic is greater than or equal to 0 mol % to less than or equal to about 5.0 mol %, such as greater than or equal to about 1.0 mol % to less than or equal to about 4.0 mol %, or greater than or equal to about 2.0 mol % to less than or equal to about 3.0 mol %, and all ranges and sub-ranges between the foregoing values. In embodiments, the glass ceramic is substantially free or free of $TiO_2$.

The glass ceramic may include one or more alkali metal oxides. The alkali metal oxides facilitate the chemical strengthening of the glass ceramic, such as through an ion exchange process. The sum of the alkali metal oxides (e.g., $Li_2O$, $Na_2O$, and $K_2O$ as well as other alkali metal oxides including $Cs_2O$ and $Rb_2O$) in the glass ceramic may be referred to as "$R_2O$", and $R_2O$ may be expressed in mol %. In some embodiments, the glass ceramic may include a mixture of alkali metal oxides, such as a combination of $Li_2O$ and $Na_2O$. a combination of $Na_2O$ and $K_2O$, a combination of $Li_2O$ and $K_2O$, or a combination of $Li_2O$, $Na_2O$, and $K_2O$. In embodiments, the glass ceramic contains at least one of $Li_2O$ and $Na_2O$. The inclusion of a mixture of alkali metal oxides in the glass ceramic may result in faster and more efficient ion exchange. Without wishing to be bound by any particular theory, it is believed that the alkali metal oxides segregate into the residual glass phase of the glass ceramic upon ceramming.

The addition of lithium in the glass ceramic allows for an ion exchange process and further reduces the softening point of the precursor glass composition. In embodiments, the glass composition generally comprises $Li_2O$ in an amount greater than or equal to 0 mol %, such as greater than or equal to about 0.5 mol %, greater than or equal to about 1.0 mol %, greater than or equal to about 1.5 mol %, greater than or equal to about 2.0 mol %, greater than or equal to about 2.5 mol %, greater than or equal to about 3.0 mol %, greater than or equal to about 3.5 mol %, greater than or equal to about 4.0 mol %, greater than or equal to about 4.5 mol %, or more. In some embodiments, the glass composition comprises $Li_2O$ in amounts less than or equal to about 5.0 mol %, such as less than or equal to about 4.5 mol %, less than or equal to about 4.0 mol %, less than or equal to about 3.5 mol %, less than or equal to about 3.0 mol %, less than or equal to about 2.5 mol %, less than or equal to about 2.0 mol %, less than or equal to about 1.5 mol %, less than or equal to about 1.0 mol %, less than or equal to about 0.5 mol %, or less. It should be understood that, in embodiments, any of the above ranges may be combined with any other range.

In embodiments, the glass composition comprises $Li_2O$ in an amount from greater than or equal to 0.0 mol % to less than or equal to about 5.0 mol %, such as from greater than or equal to about 0.5 mol % to less than or equal to about 4.5 mol %, from greater than or equal to about 1.0 mol % to less than or equal to 4.0 mol %, from greater than or equal to about 1.5 mol % to less than or equal to about 3.5 mol %, from greater than or equal to about 2.0 mol % to less than or equal to about 3.0 mol %, about 2.5 mol %, and all ranges and sub-ranges between the foregoing values.

Like $Li_2O$, $Na_2O$ aids in the ion exchangeability of the glass ceramic, and also decreases the melting point of the precursor glass composition and improves formability of the precursor glass composition. In embodiments, the glass composition generally comprises $Na_2O$ in an amount greater than or equal to 0 mol %, such as greater than or equal to about 0.5 mol %, greater than or equal to about 1.0 mol %, greater than or equal to about 1.5 mol %, greater than or equal to about 2.0 mol %, greater than or equal to about 2.5 mol %, greater than or equal to about 3.0 mol %, greater than or equal to about 3.5 mol %, greater than or equal to about 4.0 mol %, greater than or equal to about 4.5 mol %, or more. In some embodiments, the glass composition comprises $Na_2O$ in amounts less than or equal to about 5.0 mol %, such as less than or equal to about 4.5 mol %, less than or equal to about 4.0 mol %, less than or equal to about 3.5 mol %, less than or equal to about 3.0 mol %, less than or equal to about 2.5 mol %, less than or equal to about 2.0 mol %, less than or equal to about 1.5 mol %, less than or equal to about 1.0 mol %, less than or equal to about 0.5 mol %, or less. It should be understood that, in embodiments, any of the above ranges may be combined with any other range. In embodiments, the glass composition comprises $Na_2O$ in an amount from greater than or equal to 0.0 mol % to less than or equal to about 5.0 mol %, such as from greater than or equal to about 0.5 mol % to less than or equal to about 4.5 mol %, from greater than or equal to about 1.0 mol % to less than or equal to 4.0 mol %, from greater than or equal to about 1.5 mol % to less than or equal to about 3.5 mol %, from greater than or equal to about 2.0 mol % to less than or equal to about 3.0 mol %, about 2.5 mol %, and all ranges and sub-ranges between the foregoing values.

In embodiments, the glass ceramic may additionally include BaO. The inclusion of BaO in the glass ceramic increases the refractive index of the residual glass phase in the glass ceramic. The BaO may be added to the glass melt as both a carbonate and a nitrate to maintain the oxidization state of the system during melting, preventing the reduction of $Ti^{4+}$ to $Ti^{3+}$ when $TiO_2$ is present in the composition. The BaO may act to prevent undesirable coloration of the glass ceramics due to the presence of $TiO_2$. In embodiments, the glass ceramic may contain BaO in an amount of from greater than or equal to 0 mol % to less than or equal to about 2.0 mol %, such as from greater than or equal to about 0.5 mol % to less than or equal to about 1.5 mol %, about 1.0 mol %, and all ranges and sub-ranges between the foregoing values.

In embodiments, the glass ceramic may optionally include one or more fining agents. In some embodiments, the fining agents may include, for example, tin oxide ($SnO_2$) and/or arsenic oxide. In embodiments, $SnO_2$ may be present in the glass composition in an amount less than or equal to 0.3 mol %, such as from greater than or equal to 0 mol % to less than or equal to 0.3 mol %, greater than or equal to 0.1 mol % to less than or equal to 0.2 mol %, and all ranges and sub-ranges between the foregoing values. In embodiments, arsenic oxide may be present in the glass ceramic in an amount from greater than or equal to 0 mol % to less than or equal to 0.1 mol %, and all ranges and sub-ranges between the foregoing values. In embodiments, arsenic oxide may also act as a bleaching agent. In embodiments, the glass ceramic may be free or substantially free of one or both of arsenic and antimony.

From the above, glass ceramics according to embodiments may be formed from precursor glass articles formed by any suitable method, such as slot forming, float forming, rolling processes, fusion forming processes, etc.

A precursor glass article may be characterized by the manner in which it is formed. For instance, where the precursor glass article may be characterized as float-formable (i.e., formed by a float process), down-drawable and, in particular, fusion-formable or slot-drawable (i.e., formed by a down draw process such as a fusion draw process or a slot draw process).

Some embodiments of the precursor glass articles described herein may be formed by a down-draw process. Down-draw processes produce glass articles having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the precursor glass articles may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the precursor glass articles described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

The glass ceramics may be formed by ceramming a precursor glass under any suitable conditions. The ceramming does not necessarily include a separate nucleation treatment for the purposes of forming crystal nuclei in the precursor glass. The ability to produce the transparent glass ceramics without a separate nucleation step reduces the complexities of the production process, and results in energy and time savings. In some embodiments, the inclusion of a nucleation treatment may allow additional control of the produced crystallite size.

In embodiments, the ceramming occurs at temperatures of greater than or equal to about 750° C., such as greater than or equal to about 800° C., greater than or equal to about 850° C., greater than or equal to about 900° C., greater than or equal to about 950° C., greater than or equal to about 1000° C., greater than or equal to about 1050° C., greater than or equal to about 1100° C., or more. In embodiments, the ceramming occurs at temperatures of from greater than or equal to about 750° C. to less than or equal to about 1100° C., such as greater than or equal to about 800° C. to less than or equal to about 1050° C., greater than or equal to about 850° C. to less than or equal to about 1000° C., or greater than or equal to about 900° C. to less than or equal to about 950° C., and all ranges and sub-ranges between the foregoing values.

In embodiments, the ceramming extends for a time period of greater than or equal to about 30 minutes, such as greater than or equal to about 1.0 hour, greater than or equal to about 1.5 hours, greater than or equal to about 2.0 hours, greater than or equal to about 2.5 hours, greater than or equal to about 3.0 hours, greater than or equal to about 3.5 hours, greater than or equal to about 4.0 hours, greater than or equal to about 4.5 hours, greater than or equal to about 5.0 hours, greater than or equal to about 5.5 hours, greater than or equal to about 6.0 hours, greater than or equal to about 6.5 hours, greater than or equal to about 7.0 hours, greater than or equal to about 7.5 hours, greater than or equal to about 8.0 hours, greater than or equal to about 8.5 hours, greater than or equal to about 9.0 hours, greater than or equal to about 9.5 hours, greater than or equal to about 10.0 hours, greater than or equal to about 10.5 hours, greater than or equal to about 11.0 hours, greater than or equal to about 11.5 hours, greater than or equal to about 12.0 hours, greater than or equal to about 12.5 hours, greater than or equal to about 13.0 hours, greater than or equal to about 13.5 hours, greater than or equal to about 14.0 hours, greater than or equal to about 14.5 hours, greater than or equal to about 15.0 hours, greater than or equal to about 15.5 hours, greater than or equal to about 16.0 hours, greater than or equal to about 16.5 hours, greater than or equal to about 17.0 hours, greater than or equal to about 17.5 hours, greater than or equal to about 18.0 hours, greater than or equal to about 18.5 hours, greater than or equal to about 19.0 hours, greater than or equal to about 19.5 hours, greater than or equal to about 20.0 hours, greater than or equal to about 20.5 hours, greater than or equal to about 21.0 hours, greater than or equal to about 21.5 hours, greater than or equal to about 22.0 hours, greater than or equal to about 22.5 hours, greater than or equal to about 23.0 hours, or greater than or equal to about 23.5 hours. In embodiments, the ceramming extends for a time period from greater than or equal to about 30 minutes to less than or equal to about 24.0 hours, such as greater than or equal to about 1.0 hour to less than or equal to about 23.0 hours, greater than or equal to about 1.5 hours to less than or equal to about 22.0 hours, greater than or equal to about 2.0 hours to less than or equal to about 21.0 hours, greater than or equal to about 2.5 hours to less than or equal to about 20.0 hours, greater than or equal to about 3.0 hours to less than or equal to about 19.0 hours, greater than or equal to about 3.5 hours to less than or equal to about 18.0 hours, greater than or equal to about 4.0 hours to less than or equal to about 17.0 hours, greater than or equal to about 4.5 hours to less than or equal to about 16.0 hours, greater than or equal to about 5.0 hours to less than or equal to about 15.0 hours, greater than or equal to about 5.5 hours to less than or equal to about 14.0 hours, greater than or equal to about 6.0 hours to less than or equal to about 13.0 hours, greater than or equal to about 6.5 hours to less than or equal to about 12.0 hours, greater than or equal to about 7.0 hours to less than or equal to about 11.0 hours, greater than or equal to about 7.5 hours to less than or equal to about 10.0 hours, or greater than or equal to about 8.0 hours to less than or equal to about 9.0 hours, and all ranges and sub-ranges between the foregoing values.

In embodiments containing a separate nucleation treatment, the nucleation treatment occurs at temperatures of greater than or equal to about 700° C., such as greater than or equal to about 750° C., greater than or equal to about 800° C., greater than or equal to about 850° C., greater than or equal to about 900° C., greater than or equal to about 950° C., or greater than or equal to about 1000° C., or more. In embodiments, the nucleation treatment occurs at temperatures of from greater than or equal to about 700° C. to less than or equal to about 1000° C., such as greater than or equal to about 750° C. to less than or equal to about 950° C., or greater than or equal to about 800° C. to less than or equal to about 900° C., and all ranges and sub-ranges between the foregoing values.

In embodiments, the nucleation treatment extends for a time period of greater than 0 minutes, such as greater than or equal to about 30 minutes, greater than or equal to about 1.0 hour, greater than or equal to about 1.5 hours, greater than or equal to about 2.0 hours, greater than or equal to about 2.5 hours, greater than or equal to about 3.0 hours, greater than or equal to about 3.5 hours, greater than or equal to about 4.0 hours, or more. In embodiments, the ceramming extends for a time period from greater than or equal to about 30 minutes to less than or equal to about 4.0 hours, such as greater than or equal to about 1.0 hour to less than or equal to about 3.5 hours, or greater than or equal to about 1.5 hours to less than or equal to about 3.0 hours, and all ranges and sub-ranges between the foregoing values.

In embodiments, the ceramming may be conducted by irradiating the precursor glass with a laser. The use of a laser allows for the localized ceramming of regions or portions of the precursor glass article, such localized ceramming may produce residual stresses and tensions in the glass ceramic. The stresses and tensions can then create regions of a glass ceramic article with increased mechanical strength, such as the edges of a housing or back plate for a mobile electronic device. In embodiments, the laser used in the ceramming process may be a carbon dioxide laser. Additionally, the use of a laser in the ceramming process allows for the formation of patterns of ceramic regions in the glass ceramic.

In embodiments, the glass ceramics are also chemically strengthened, such as by ion exchange, making a glass ceramic that is damage resistant for applications such as, but not limited to, display covers. With reference to FIG. 1, the glass ceramic has a first region under compressive stress (e.g., first and second compressive layers 120, 122 in FIG. 1) extending from the surface to a depth of compression (DOC) of the glass ceramic and a second region (e.g., central region 130 in FIG. 1) under a tensile stress or central tension (CT) extending from the DOC into the central or interior region of the glass ceramic. As used herein, DOC refers to the depth at which the stress within the glass ceramic changes from compressive to tensile. At the DOC, the stress crosses from a positive (compressive) stress to a negative (tensile) stress and thus exhibits a stress value of zero.

According to the convention normally used in the art, compression or compressive stress is expressed as a negative (<0) stress and tension or tensile stress is expressed as a positive (>0) stress. Throughout this description, however, CS is expressed as a positive or absolute value—i.e., as recited herein, CS=|CS|. The compressive stress (CS) may have a maximum at the surface of the glass, and the CS may vary with distance d from the surface according to a function. Referring again to FIG. 1, a first compressive layer 120 extends from first surface 110 to a depth $d_1$ and a second compressive layer 122 extends from second surface 112 to a depth $d_2$. Together, these segments define a compression or CS of the glass ceramic 100. Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The compressive stress of both compressive stress regions (120, 122 in FIG. 1) is balanced by stored tension in the central region (130) of the glass. The maximum central tension (CT) and DOC values are measured using a scattered light polariscope (SCALP) technique known in the art.

Compressive stress layers may be formed in the glass by exposing the glass to an ion exchange solution. In embodiments, the ion exchange solution may be molten nitrate salt. In some embodiments, the ion exchange solution may be molten $KNO_3$, molten $NaNO_3$, or combinations thereof. In certain embodiments, the ion exchange solution may comprise less than or equal to about 100% molten $KNO_3$, such as less than or equal to about 95% molten $KNO_3$, less than or equal to about 90% molten $KNO_3$, less than or equal to about 80% molten $KNO_3$, less than or equal to about 75% molten $KNO_3$, less than or equal to about 70% molten $KNO_3$, less than or equal to about 65% molten $KNO_3$, less than or equal to about 60% molten $KNO_3$, or less. In certain embodiments, the ion exchange solution may comprise greater than or equal to about 10% molten $NaNO_3$, such as greater than or equal to about 15% molten $NaNO_3$, greater than or equal to about 20% molten $NaNO_3$, greater than or equal to about 25% molten $NaNO_3$, greater than or equal to about 30% molten $NaNO_3$, greater than or equal to about 35% molten $NaNO_3$, greater than or equal to about 40% molten $NaNO_3$, or more. In other embodiments, the ion exchange solution may comprise about 80% molten $KNO_3$ and about 20% molten $NaNO_3$, about 75% molten $KNO_3$ and about 25% molten $NaNO_3$, about 70% molten $KNO_3$ and about 30% molten $NaNO_3$, about 65% molten $KNO_3$ and about 35% molten $NaNO_3$, or about 60% molten $KNO_3$ and about 40% molten $NaNO_3$, and all ranges and sub-ranges between the foregoing values. In embodiments, other sodium and potassium salts may be used in the ion exchange solution, such as, for example sodium or potassium nitrites, phosphates, or sulfates. In embodiments, the ion exchange solution may include silicic acid, such as less than or equal to about 1 wt % silicic acid.

The glass ceramic may be exposed to the ion exchange solution by dipping the glass ceramic into a bath of the ion exchange solution, spraying the ion exchange solution onto the glass ceramic, or otherwise physically applying the ion exchange solution to the glass ceramic. Upon exposure to the glass ceramic, the ion exchange solution may, according to embodiments, be at a temperature from greater than or equal to 400° C. to less than or equal to 500° C., such as from greater than or equal to 410° C. to less than or equal to 490° C., from greater than or equal to 420° C. to less than or equal to 480° C., from greater than or equal to 430° C. to less than or equal to 470° C., or from greater than or equal to 440° C. to less than or equal to 460° C., and all ranges and sub-ranges between the foregoing values. In embodiments, the glass ceramic may be exposed to the ion exchange solution for a duration from greater than or equal to 4 hours to less than or equal to 48 hours, such as from greater than or equal to 8 hours to less than or equal to 44 hours, from greater than or equal to 12 hours to less than or equal to 40 hours, from greater than or equal to 16 hours to less than or equal to 36 hours, from greater than or equal to 20 hours to less than or equal to 32 hours, or from greater than or equal to 24 hours to less than or equal to 28 hours, and all ranges and sub-ranges between the foregoing values.

The ion exchange process may be performed in an ion exchange solution under processing conditions that provide an improved compressive stress profile as disclosed, for example, in U.S. Patent Application Publication No. 2016/0102011, which is incorporated herein by reference in its entirety.

After an ion exchange process is performed, it should be understood that a composition at the surface of the glass ceramic may be different than the composition of the as-formed glass ceramic (i.e., the glass ceramic before it undergoes an ion exchange process). This results from one type of alkali metal ion in the as-formed glass, such as, for example $Li^+$ or $Na^+$, being replaced with larger alkali metal ions, such as, for example $Na^+$ or $K^+$, respectively. However, the composition of the glass ceramic at or near the center of the depth of the glass article will, in embodiments, be the least changed by the ion exchange process and may have a composition substantially the same or the same as the as-formed glass ceramic.

Figure 2A:
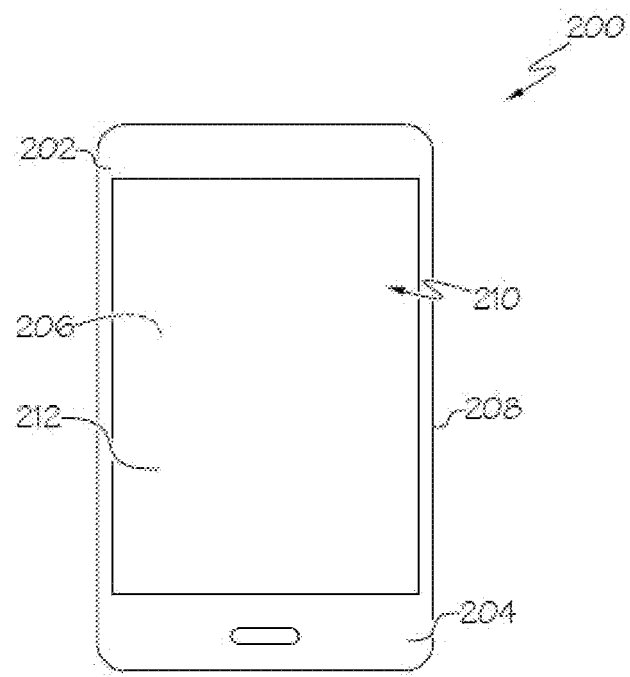
FIG. 2A is a plan view of an exemplary electronic device incorporating any of the glass ceramic articles disclosed herein.
Figure 2B:
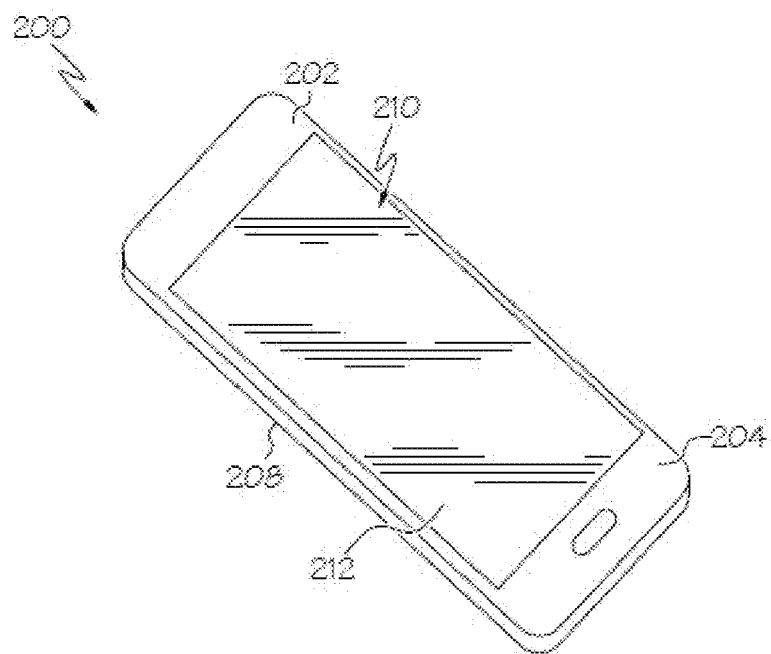
FIG. 2B is a perspective view of the exemplary electronic device of FIG. 2A.

The glass ceramic articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass ceramic articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least a portion of at least one of the cover substrate 212 and/or the housing 202 may include any of the glass articles disclosed herein.

Examples

Embodiments will be further clarified by the following examples. It should be understood that these examples are not limiting to the embodiments described above.

Precursor glasses having the compositions in Table 1 below were prepared. In Table 1, all components are in mol %, and various properties of the glass compositions were measured according to the methods described herein.

TABLE 1

| Analyzed (mol %) | 1 | 2 | 3 | 4 | 5 | 6 |
|---|---|---|---|---|---|---|
| $SiO_2$ | 50.0 | 54.0 | 54.1 | 54.2 | 54.2 | 48.3 |
| $Al_2O_3$ | 21.0 | 20.8 | 20.9 | 21.0 | 21.3 | 23.6 |
| ZnO | 10.1 | 10.5 | 10.6 | 10.4 | 10.5 | 12.5 |
| MgO | 5.8 | 6.0 | 6.1 | 6.0 | 6.0 | 6.9 |
| $ZrO_2$ | 3.4 | 2.3 | 1.9 | 2.2 | 2.2 | 2.3 |
| $TiO_2$ | 4.1 | 2.2 | 2.2 | 1.7 | 1.2 | 2.2 |
| $Li_2O$ | 3.9 | | | | | |
| $Na_2O$ | 0.1 | 2.6 | 2.6 | 2.9 | 3.1 | 2.6 |
| BaO | 1.2 | 1.2 | 1.2 | 1.2 | 1.2 | 1.2 |
| $As_2O_5$ | 0.1 | 0.1 | 0.1 | 0.1 | 0.1 | 0.1 |
| $NO_2$ | 0.2 | 0.2 | 0.2 | 0.2 | 0.2 | 0.2 |
| $B_2O_3$ | | | | | | |
| CaO | | | | | | |
| $Eu_2O_3$ | | | | | | |
| $Ta_2O_5$ | | | | | | |
| $La_2O_3$ | | | | | | |
| $P_2O_5$ | | | | | | |
| Density (g/cm³) | 2.934 | 2.864 | 2.848 | 2.853 | 2.845 | 2.949 |
| Hardness (GPa) | | 8.47 | | | | |
| Poisson's Ratio | | 0.254 | | | | |
| Shear Modulus (GPa) | | 39.30 | | | | |
| Young's Modulus (GPa) | | 98.60 | | | | |
| RI @ 589.3 nm | | 1.5847 | | | | |

| Analyzed (mol %) | 7 | 8 | 9 | 10 | 11 | 12 |
|---|---|---|---|---|---|---|
| $SiO_2$ | 47.8 | 46.1 | 44.5 | 54.1 | 54.1 | 54.1 |
| $Al_2O_3$ | 23.8 | 24.7 | 25.6 | 20.8 | 20.6 | 21.3 |
| ZnO | 12.7 | 13.2 | 13.7 | 10.5 | 10.4 | 10.3 |
| MgO | 7.1 | 7.4 | 7.7 | 6.0 | 6.0 | 5.8 |
| $ZrO_2$ | 2.2 | 2.3 | 2.2 | 2.3 | 2.4 | 3.2 |
| $TiO_2$ | 2.2 | 2.2 | 2.2 | 2.2 | 2.2 | 0.0 |
| $Li_2O$ | | | | | | |
| $Na_2O$ | 2.7 | 2.7 | 2.7 | 2.6 | 2.6 | 3.7 |
| BaO | 1.2 | 1.2 | 1.2 | 1.2 | 1.2 | 1.2 |

TABLE 1-continued

| | | | | | | |
|---|---|---|---|---|---|---|
| As$_2$O$_5$ | 0.1 | 0.1 | 0.1 | 0.1 | 0.1 | 0.1 |
| NO$_2$ | 0.2 | 0.2 | 0.2 | 0.2 | 0.2 | 0.2 |
| B$_2$O$_3$ | | | | | | |
| CaO | | | | | | |
| Eu$_2$O$_3$ | | | | | | |
| Ta$_2$O$_5$ | | | | | | |
| La$_2$O$_3$ | | | | | | |
| P$_2$O$_5$ | | | | | | |
| Density (g/cm$^3$) | 2.957 | 2.98 | 3.006 | 2.856 | 2.858 | 0 |
| Hardness (GPa) | | | | 8.36 | 8.30 | |
| Poisson's Ratio | | | | 0.257 | 0.252 | |
| Shear Modulus (GPa) | | | | 39.0 | 39.0 | |
| Young's Modulus (GPa) | | | | 97.9 | 97.6 | |
| RI @ 589.3 nm | | | | 1.5830 | 1.5840 | |

| Analyzed (mol %) | 13 | 14 | 15 | 16 | 17 | 18 |
|---|---|---|---|---|---|---|
| SiO$_2$ | 54.9 | 47.7 | 44.1 | 49.7 | 54.3 | 52.7 |
| Al$_2$O$_3$ | 20.7 | 23.6 | 25.4 | 19.7 | 20.5 | 19.7 |
| ZnO | 10.4 | 12.5 | 13.6 | 9.6 | | 10.1 |
| MgO | 6.0 | 7.0 | 7.7 | 5.4 | 15.9 | 5.6 |
| ZrO$_2$ | 2.9 | 2.8 | 2.9 | 4.3 | 3.0 | 3.2 |
| TiO$_2$ | 2.2 | 2.2 | 2.2 | | 2.2 | 2.2 |
| Li$_2$O | | | | | | |
| Na$_2$O | 2.7 | 2.7 | 2.6 | 3.6 | 2.6 | 2.5 |
| BaO | 0.0 | 1.2 | 1.2 | 1.1 | 1.2 | 1.2 |
| As$_2$O$_5$ | 0.1 | 0.1 | 0.1 | 0.1 | 0.1 | 0.1 |
| NO$_2$ | | 0.2 | 0.2 | 0.2 | 0.2 | 0.2 |
| B$_2$O$_3$ | | | | 3.9 | | |
| CaO | | | | | | |
| Eu$_2$O$_3$ | | | | | | |
| Ta$_2$O$_5$ | | | | | | |
| La$_2$O$_3$ | | | | | | 2.5 |
| P$_2$O$_5$ | | | | 2.2 | | |
| Density (g/cm$^3$) | 2.829 | 2.967 | 3.016 | | 2.726 | 0 |
| Hardness (GPa) | | | | | | |
| Poisson's Ratio | | | | | | |
| Shear Modulus (GPa) | | | | | | |
| Young's Modulus (GPa) | | | | | | |
| RI @ 589.3 nm | 1.5832 | 1.6026 | 1.6117 | | 1.5745 | |

| Analyzed (mol %) | 19 | 20 | 21 | 22 | 23 | 24 |
|---|---|---|---|---|---|---|
| SiO$_2$ | 51.4 | 53.1 | 51.7 | 54.1 | 52.9 | 56.7 |
| Al$_2$O$_3$ | 19.1 | 18.9 | 20.1 | 20.9 | 21.6 | 22.4 |
| ZnO | 9.9 | 10.5 | 9.7 | 10.1 | 10.1 | 10.7 |
| MgO | 5.4 | 5.3 | 5.7 | 5.8 | 6.0 | 6.2 |
| ZrO$_2$ | 3.3 | 3.3 | 4.8 | | | |
| TiO$_2$ | 2.1 | 2.2 | | | | |
| Li$_2$O | | | | | | |
| Na$_2$O | 2.5 | 2.6 | 3.7 | 3.8 | 3.9 | 3.9 |
| BaO | 1.1 | 1.2 | 1.1 | | | |
| As$_2$O$_5$ | 0.1 | 0.1 | 0.1 | 0.1 | 0.1 | 0.1 |
| NO$_2$ | 0.2 | 0.2 | 0.2 | | | |
| B$_2$O$_3$ | | | | | | |
| CaO | | | 0.3 | | | |
| Eu$_2$O$_3$ | | 2.4 | | | | |
| Ta$_2$O$_5$ | | | | | 5.2 | |
| La$_2$O$_3$ | 4.8 | | | | | |
| P$_2$O$_5$ | | | 2.6 | 5.2 | | |
| Density (g/cm$^3$) | 0 | 0 | 2.851 | | | |
| Hardness (GPa) | | | 8.48 | | | |
| Poisson's Ratio | | | 0.252 | | | |
| Shear Modulus (GPa) | | | 37.6 | | | |
| Young's Modulus (GPa) | | | 94.0 | | | |
| RI @ 589.3 nm | | | 1.5728 | | | |

The density values refer to a value as measured by the buoyancy method of ASTM C693-93(2013). The hardness was measured with a nanoindenter, as described above. The Young's modulus and Shear Modulus was measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts." The refractive index (RI) of the precursor glass was measured at a wavelength of 589.3 nm.

TABLE 2

| Ceram Schedule | Conditions |
|---|---|
| B | 1000° C. for 4 hrs |
| D | 950° C. for 4 hrs |
| E | 850° C. for 4 hrs |
| H | 800° C. for 4 hrs |
| I | 900° C. for 4 hrs |

TABLE 2-continued

| Ceram Schedule | Conditions |
|---|---|
| N | Slow Ramp 1 950° C. for 4 hrs |
| O | Slow Ramp 1 850° C. for 4 hrs |
| P | 895° C. for 4 hrs |
| X | 1050° C. for 4 hrs |

Ceram schedules for forming glass ceramics from the precursor glass compositions are provided in Table 2. Unless otherwise indicated, the ceram schedules included heating the precursor glass in a furnace from room temperature at a ramp rate of 5° C./min to the indicated treatment condition, holding for the indicated time, and then the furnace was allowed to cool to ambient temperature. The ceram schedules that indicate the Slow Ramp 1 condition included heating the precursor glass in a furnace from room temperature at a ramp rate of 5° C./min to 700° C. and then at a ramp rate of 1° C./min to the indicated treatment condition.

The phase assemblage of the glass ceramics formed by ceramming the precursor glass compositions was determined based on x-ray diffraction (XRD) analysis and is reported in Table 4 below. The amount of the residual glass, gahnite, and tetragonal $ZrO_2$ phases present in the glass ceramic, in wt %, were measured using Rietveld quantitative analysis. The phases detected in the phase assemblage determination are described in Table 3 below.

TABLE 3

| | Phase |
|---|---|
| T | tetragonal $ZrO_2$ |
| G | gahnite |
| V | virgilite |
| B3 | baddeleyite |

The glass ceramics were produced using the ceram schedules of Table 2 from the compositions of Table 1. The properties of the resulting glass ceramics and the ceram schedules that produced the glass ceramics are reported in Table 4 below. Additionally, some of the glass ceramics were ion exchanged, as reported in Table 4. The density difference reported in Table 5 refers to the change in the density of the precursor glass when forming the glass ceramic.

TABLE 4

| Glass Composition | 1 | 2 | 3 | 4 | 5 | 6 |
|---|---|---|---|---|---|---|
| Ceram Schedule | E | B | B | B | B | B |
| Density (g/cm³) | 3.061 | 2.975 | 2.957 | 2.963 | 2.950 | 3.091 |
| Density Difference (%) | 4.15 | 3.73 | 3.69 | 3.71 | 3.56 | 4.59 |
| Phase 1 | G | G | G | G | G | G |
| Crystallite Size Phase 1 (Å) | 68 | 148 | 200 | 263 | 523 | 169 |
| Phase 2 | T, V | T | T | T | T | T |
| Crystallite Size Phase 2 (Å) | | 115 | 137 | 190 | 233 | 166 |
| Glass (wt %) | | 59 | 59 | 58 | 60 | 51 |
| Gahnite (wt %) | | 38.1 | 39.3 | 39.3 | 37.0 | 46.4 |
| Tet $ZrO_2$ (wt %) | | 3.0 | 2.2 | 2.9 | 3.3 | 3.0 |
| Hardness (GPa) | | 9.92 | | | | |
| Poisson's Ratio | | 0.208 | | | | |
| Shear Modulus (GPa) | | 44.1 | | | | |
| Young's Modulus (GPa) | | 106.6 | | | | |
| RI @ 589.3 nm | | | | | | |

| Glass Composition | 7 | 8 | 9 | 10 | 11 | 12 |
|---|---|---|---|---|---|---|
| Ceram Schedule | I | I | I | D | D | B |
| Density (g/cm³) | | | | 2.978 | 2.981 | |
| Density Difference (%) | | | | 4.10 | 4.13 | |
| Phase 1 | G | G | G | G | G | |
| Crystallite Size Phase 1 (Å) | 141 | 135 | 134 | 126 | 99 | |
| Phase 2 | T | T | T | T | T | |
| Crystallite Size Phase 2 (Å) | 131 | 130 | 77 | 117 | 88 | |
| Glass (wt %) | | | | 60 | 61 | |
| Gahnite (wt %) | | | | 27 | 37 | |
| Tet $ZrO_2$ (wt %) | | | | 2.7 | 2.8 | |
| Hardness (GPa) | | | | | | |
| Poisson's Ratio | | | | | | |
| Shear Modulus (GPa) | | | | | | |
| Young's Modulus (GPa) | | | | | | |
| RI @ 589.3 nm | | | | | | |

| Glass Composition | 13 | 14 | 15 | 16 | 17 | 18 |
|---|---|---|---|---|---|---|
| Ceram Schedule | B | B | B | O | | B |
| Density (g/cm³) | 2.949 | 3.117 | 3.196 | 2.88 | | |
| Density Difference (%) | 4.07 | 4.81 | 5.63 | | | |
| Phase 1 | G | G | G | | G | |
| Crystallite Size Phase 1 (Å) | 104 | 158 | 132 | | 180 | |

TABLE 4-continued

| | | | | | |
|---|---|---|---|---|---|
| Phase 2 | T | T | T | | T |
| Crystallite Size Phase 2 (Å) | 102 | 168 | 152 | | 112 |
| Glass (wt %) | 60 | 50 | 44 | 64 | 68 |
| Gahnite (wt %) | 37 | 46 | 51 | 28 | 26 |
| Tet ZrO$_2$ (wt %) | 3.4 | 4.0 | 4.3 | 8.2 | 6 |
| Hardness (GPa) | | | | | |
| Poisson's Ratio | | | | | |
| Shear Modulus (GPa) | | | | | |
| Young's Modulus (GPa) | | | | | |
| RI @ 589.3 nm | | | | | |

| Glass Composition | 19 | 20 | 21 |
|---|---|---|---|
| Ceram Schedule | B | B | N |
| Density (g/cm$^3$) | | | 2.931 |
| Density Difference (%) | | | 2.73 |
| Phase 1 | | | G |
| Crystallite Size Phase 1 (Å) | | | 152 |
| Phase 2 | | | T |
| Crystallite Size Phase 2 (Å) | | | 139 |
| Glass (wt %) | | | 62 |
| Gahnite (wt %) | | | 30 |
| Tet ZrO$_2$ (wt %) | | | 7.9 |
| Hardness (GPa) | | | 8.95 |
| Poisson's Ratio | | | 0.21 |
| Shear Modulus (GPa) | | | 39.9 |
| Young's Modulus (GPa) | | | 96.4 |
| RI @ 589.3 nm | | | 1.5717 |

| Glass Composition | 1 | 2 | 3 | 4 | 5 | 6 |
|---|---|---|---|---|---|---|
| Ceram Schedule | H | I | I | I | I | I |
| Density (g/cm$^3$) | 3.056 | | | | | |
| Density Difference (%) | 3.99 | | | | | |
| Phase 1 | G | G | G | G | G | G |
| Crystallite Size Phase 1 (Å) | 55 | 130 | 145 | 183 | 220 | 151 |
| Phase 2 | V | T | T | T | | T |
| Crystallite Size Phase 2 (Å) | | 117 | 131 | 165 | | 158 |
| Glass (wt %) | | 61 | 63 | 61 | 94 | 52 |
| Gahnite (wt %) | | 37.3 | 36.1 | 36.4 | 6.3 | 45.6 |
| Tet ZrO$_2$ (wt %) | | 2.2 | 1.1 | 2.2 | n/a | 2.2 |
| Baddeleyite (wt %) | | | | | | |
| MgTa$_2$O$_6$ (wt %) | | | | | | |
| Mullite (wt %) | | | | | | |
| Cordierite (wt %) | | | | | | |

| Glass Composition | 7 | 8 | 9 | 10 | 11 |
|---|---|---|---|---|---|
| Ceram Schedule | H | H | H | P | P |
| Density (g/cm$^3$) | 2.954 | 2.976 | 3.006 | 2.98 | 2.982 |
| Density Difference (%) | −0.10 | −0.13 | 0.00 | 4.16 | 4.16 |
| Phase 1 | no phases | no phases | no phases | G | G |
| Crystallite Size Phase 1 (Å) | | | | 125 | 91 |
| Phase 2 | | | | T | T |
| Crystallite Size Phase 2 (Å) | | | | 127 | 117 |
| Glass (wt %) | 51 | 48 | 46 | 59 | 61 |
| Gahnite (wt %) | 47 | 49 | 51 | 38 | 36 |
| Tet ZrO$_2$ (wt %) | 2.3 | 2.6 | 2.8 | 2.6 | 2.6 |
| Baddeleyite (wt %) | | | | | |
| MgTa$_2$O$_6$ (wt %) | | | | | |
| Mullite (wt %) | | | | | |
| Cordierite (wt %) | | | | | |

| Glass Composition | 13 | 16 | 21 | 22 | 23 | 24 |
|---|---|---|---|---|---|---|
| Ceram Schedule | N | N | Q | N | N | N |
| Density (g/cm$^3$) | 2.953 | | 2.937 | 2.631 | 3.453 | 2.741 |
| Density Difference (%) | 4.20 | | 2.93 | | | |
| Phase 1 | G | | G | | | |
| Crystallite Size Phase 1 (Å) | 76 | | 149 | | | |

TABLE 4-continued

| | | | | | | |
|---|---|---|---|---|---|---|
| Phase 2 Crystallite Size Phase 2 (Å) | T * | T 98 | | | | |
| Glass (wt %) | 63 | 64 | 62 | 100 | 69 | 55 |
| Gahnite (wt %) | 33 | 28 | 30 | | 17 | 11 |
| Tet ZrO$_2$ (wt %) | 3.6 | 6.6 | 8.2 | | | |
| Baddeleyite (wt %) | | 1.2 | | | | |
| MgTa$_2$O$_6$ (wt %) | | | | | 13.42 | |
| Mullite (wt %) | | | | | | 27.95 |
| Cordierite (wt %) | | | | | | 6.03 |
| | | | | | | |
| Glass Composition | 2 | 10 | 11 | 2 | 10 | 11 |
| | | | | | | |
| Ceram Schedule | I | I | I | D | D | D |
| Density (g/cm$^3$) | | 2.978 | 2.976 | 2.972 | 2.969 | 2.974 |
| Density Difference (%) | | 4.10 | 3.97 | 3.63 | 3.81 | 3.90 |
| Phase 1 | G | G | G | G | G | G |
| Crystallite Size Phase 1 (Å) | 138 | 156 | 163 | 167 | 226 | 168 |
| Phase 2 | T | T | T | T | T | T |
| Crystallite Size Phase 2 (Å) | 128 | 159 | 138 | 140 | 174 | 144 |
| Glass (wt %) | 61 | 60 | 60 | 60 | 60 | 60 |
| Gahnite (wt %) | 37 | 38 | 37 | 37 | 37 | 37 |
| Tet ZrO$_2$ (wt %) | 2.58 | 2.52 | 3.13 | 3.3 | 3.1 | 3.7 |
| | | | | | | |
| Glass Composition | 2 | 2 | 10 | 11 | 10 | 11 |
| | | | | | | |
| Ceram Schedule | N | X | X | X | N | N |
| Density (g/cm$^3$) | 2.969 | 2.961 | 2.957 | 2.96 | 2.974 | 2.972 |
| Density Difference (%) | 3.54 | 3.28 | 3.42 | 3.45 | 3.97 | 3.84 |
| Phase 1 | G | G | G | G | G | G |
| Crystallite Size Phase 1 (Å) | 107 | 250 | 334 | 256 | 115 | 108 |
| Phase 2 | T | T | T | T | T | T |
| Crystallite Size Phase 2 (Å) | 95 | 172 | 199 | 173 | 97 | 80 |
| Glass (wt %) | 61 | 60 | 60 | 60 | 61 | 60 |
| Gahnite (wt %) | 36 | 37 | 37 | 36 | 36 | 37 |
| Tet ZrO$_2$ (wt %) | 3.2 | 3.4 | 3.5 | 3.9 | 3.2 | 3.5 |

The crystallite sizes are reported in angstroms. Where an "*" is indicated for the crystallite size, the crystallite size for the relevant phase was not determined.

Figure 3:
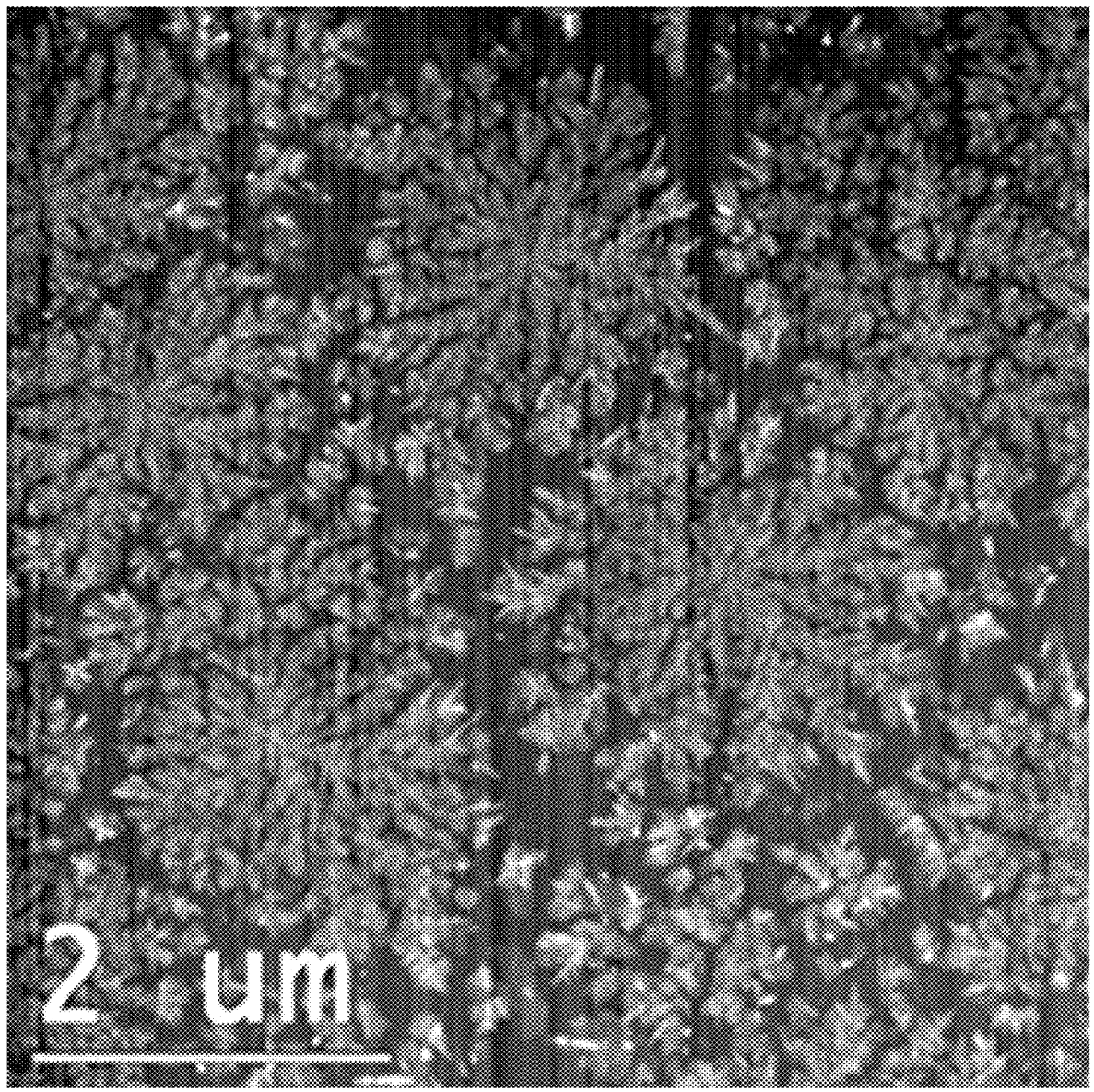
FIG. 3 is a tunneling electron microscope (TEM) image of a glass ceramic according to an embodiment.

FIG. 3 is a tunneling electron microscope (TEM) image of Glass Composition 5 after being cerammed at 1000° C. for 4 hours. The darkest areas of FIG. 3 correspond to the residual glass phase, the gray areas correspond to the gahnite-spinel solid solution crystal phase, and the brightest areas correspond to a titanium containing tetragonal ZrO$_2$ crystal phase. As shown in FIG. 3, the crystal phases form dendritic structures.

Figure 4:
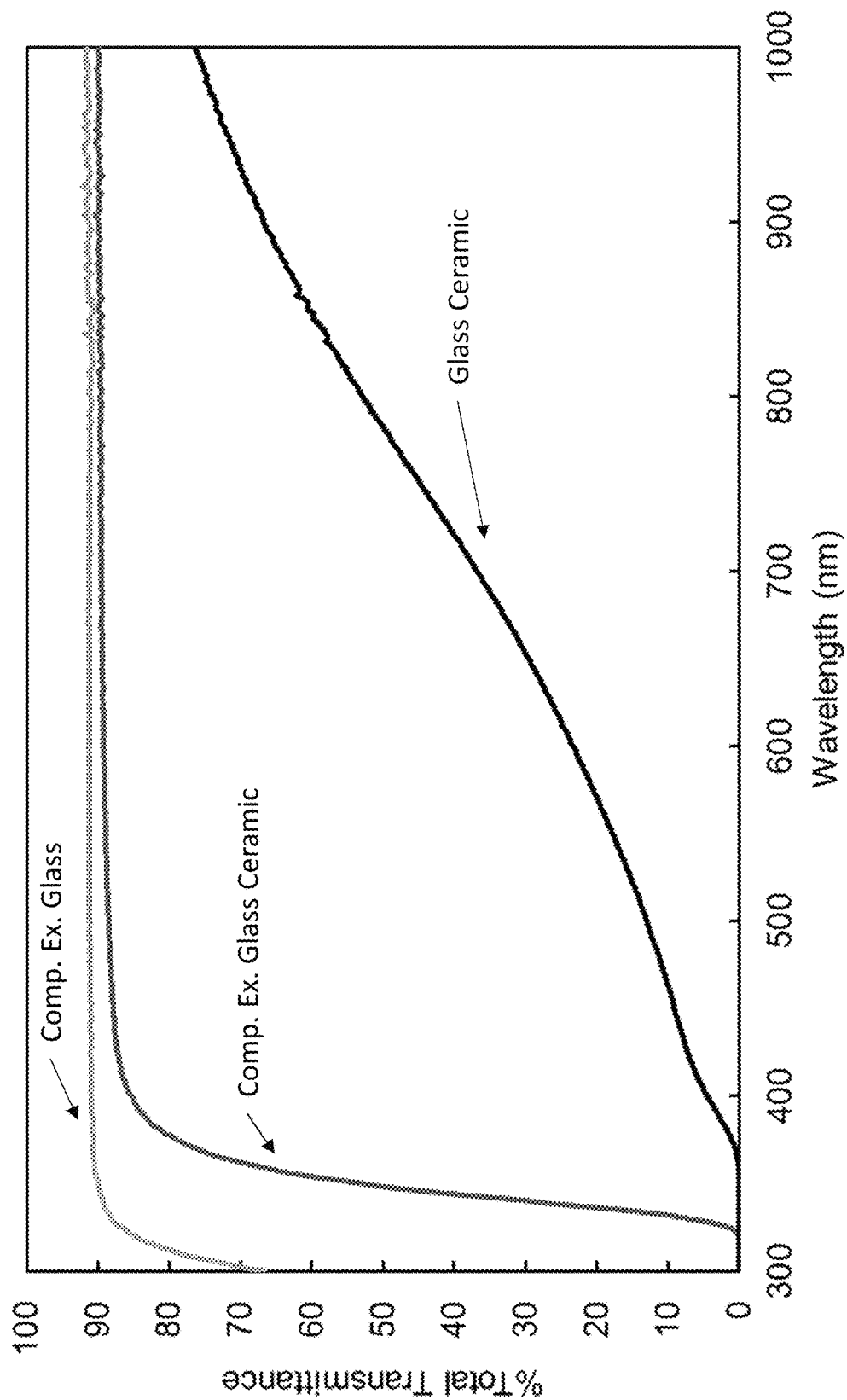
FIG. 4 is a plot of total transmittance as a function of wavelength for a comparative glass sample, a comparative glass ceramic sample, and a glass ceramic according to an embodiment.

FIG. 4 provides the measured total transmittance of a comparative transparent glass sample, a comparative transparent glass ceramic sample, and a glass ceramic formed by ceramming Glass Composition 2 in the visible wavelength range. Each of the samples was 1 mm thick.

Figure 5:
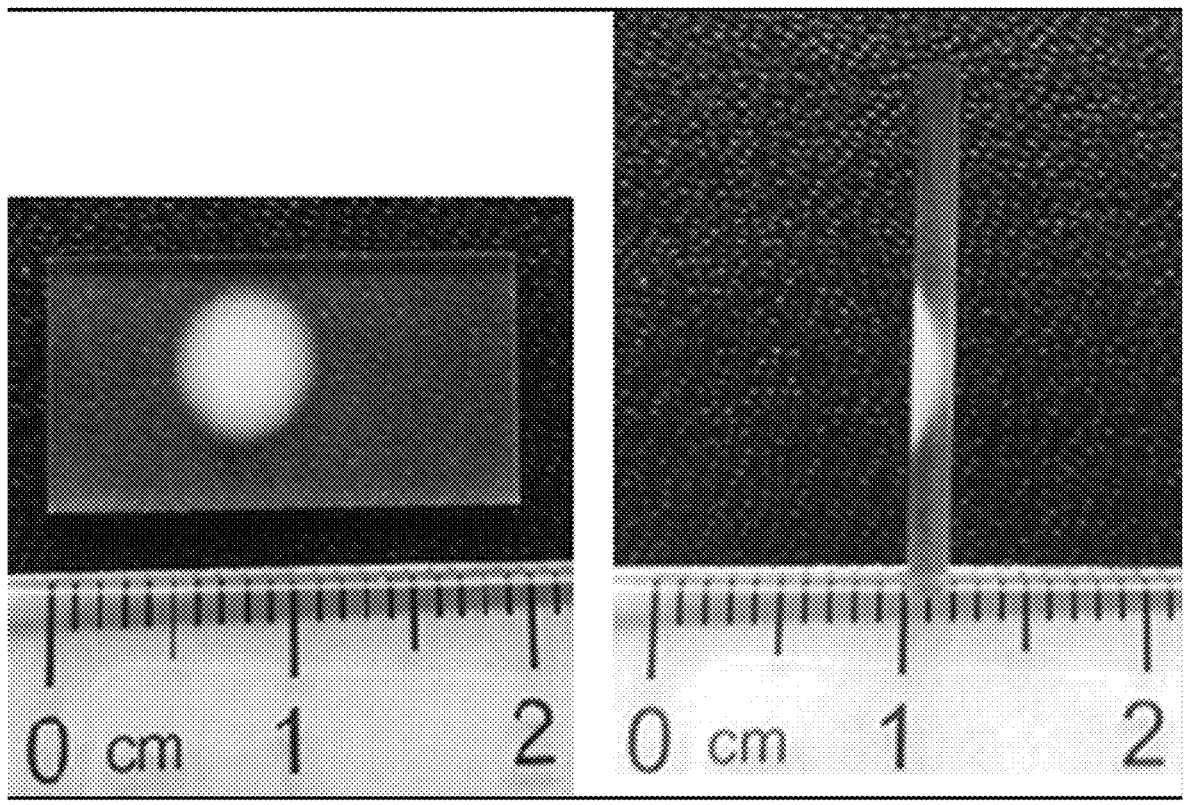
FIG. 5 is a photograph of a front view and a side view of a precursor glass according to an embodiment that has been locally cerammed by irradiation with a carbon dioxide laser.

FIG. 5 is a photograph of a front view and a side view of a precursor glass according to an embodiment that has been locally cerammed by irradiation with a carbon dioxide laser. The transparent regions are residual glass and the opaque region contains a crystalline phase.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method, comprising:
    ceramming a precursor glass to form a glass ceramic that is opaque in the visible range,
    wherein the glass ceramic comprises:
        a first crystal phase including $(Mg_xZn_{1-x})Al_2O_4$ where x is less than 1; and
        a second crystal phase consists of tetragonal ZrO$_2$ and one or more of MgTa$_2$O$_6$, mullite, and cordierite;
        wherein the glass-ceramic has a Young's modulus greater than or equal to 90 GPa, and has a hardness greater than or equal to 7.5 GPa.

2. The method of claim 1, further comprising forming nuclei in the precursor glass prior to the ceramming.

3. The method of claim 1, wherein the ceramming comprises heat treating the precursor glass at a temperature of at least 750° C. for a time period of at least 30 minutes.

4. The method of claim 1, wherein the ceramming comprises irradiating the precursor glass with a laser to form the glass ceramic.

5. The method of claim 1, further comprising ion exchanging the glass ceramic.

6. A method, comprising:
    ceramming a precursor glass to form a glass ceramic that is opaque in the visible range, wherein the glass ceramic comprises:
- a first crystal phase including $(Mg_xZn_{1-x})Al_2O_4$ where x is less than 1; and
- a second crystal phase including tetragonal $ZrO_2$ and at least one of $MgTa_2O_6$, mullite, and cordierite;
- wherein the glass-ceramic has a Young's modulus greater than or equal to 90 GPa, and has a hardness greater than or equal to 7.5 GPa.

7. The method of claim 6, further comprising forming nuclei in the precursor glass prior to the ceramming.

8. The method of claim 6, wherein the ceramming comprises heat treating the precursor glass at a temperature of at least 750° C. for a time period of at least 30 minutes.

9. The method of claim 6, wherein the ceramming comprises irradiating the precursor glass with a laser to form the glass ceramic.

10. The method of claim 6, further comprising ion exchanging the glass ceramic.

11. The method of claim 6, wherein the second crystal phase includes $MgTa_2O_6$.

12. The method of claim 6, wherein the second crystal phase includes mullite.

13. The method of claim 6, wherein the second crystal phase includes cordierite.

14. A method, comprising:
ceramming a precursor glass to form a glass ceramic that is opaque in the visible range,
wherein the glass ceramic comprises:
- a first crystal phase including $(Mg_xZn_{1-x})Al_2O_4$ where x is less than 1; and
- a second crystal phase consists of mullite and cordierite;
- wherein the glass-ceramic has a Young's modulus greater than or equal to 90 GPa, and has a hardness greater than or equal to 7.5 GPa.

15. The method of claim 14, further comprising forming nuclei in the precursor glass prior to the ceramming.

16. The method of claim 14, wherein the ceramming comprises heat treating the precursor glass at a temperature of at least 750° C. for a time period of at least 30 minutes.

17. The method of claim 14, wherein the ceramming comprises irradiating the precursor glass with a laser to form the glass ceramic.

18. The method of claim 14, further comprising ion exchanging the glass ceramic.

\* \* \* \* \*